United States Patent
Umeyama

(10) Patent No.: US 11,027,424 B2
(45) Date of Patent: Jun. 8, 2021

(54) ROBOT HAND, ROBOT APPARATUS, AND METHOD OF CONTROLLING ROBOT HAND

(71) Applicant: CANON KABUSHIKI KAISHA, Tokyo (JP)

(72) Inventor: Manabu Umeyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 16/017,111

(22) Filed: Jun. 25, 2018

(65) Prior Publication Data
US 2019/0001491 A1   Jan. 3, 2019

(30) Foreign Application Priority Data

Jun. 30, 2017   (JP) .............................. JP2017-129349

(51) Int. Cl.
| | |
|---|---|
| B25J 15/08 | (2006.01) |
| B25J 9/16 | (2006.01) |
| B25J 13/02 | (2006.01) |
| B25J 19/02 | (2006.01) |
| B25J 15/10 | (2006.01) |
| B25J 13/08 | (2006.01) |
| B25J 15/00 | (2006.01) |

(52) U.S. Cl.
CPC ............. B25J 9/1612 (2013.01); B25J 13/02 (2013.01); B25J 13/085 (2013.01); B25J 15/0009 (2013.01); B25J 15/10 (2013.01); B25J 15/103 (2013.01); B25J 19/021 (2013.01)

(58) Field of Classification Search
CPC ........ B25J 9/1612; B25J 13/02; B25J 13/085; B25J 13/082; B25J 19/021; B25J 15/10; B25J 15/0009; B25J 15/08; B25J 15/103; Y10S 901/31; Y10S 901/34; G05B 2219/39486; G05B 2219/39491
USPC ......... 700/245, 258; 294/104, 106; 414/4, 6, 414/729; 901/28, 38, 39; 623/57
See application file for complete search history.

(56) References Cited

U.S. PATENT DOCUMENTS

| | | | | |
|---|---|---|---|---|
| 9,266,237 | B2 * | 2/2016 | Nomura ................. | B25J 9/1612 |
| 9,844,885 | B2 * | 12/2017 | Wong ...................... | B25J 15/10 |
| 2004/0054424 | A1 * | 3/2004 | Matsuda .............. | B25J 15/0009 |
| | | | | 623/64 |
| 2006/0145494 | A1 * | 7/2006 | Nihei ..................... | B25J 9/1612 |
| | | | | 294/106 |
| 2012/0175904 | A1 * | 7/2012 | Murakami .............. | B25J 15/08 |
| | | | | 294/213 |
| 2012/0205932 | A1 * | 8/2012 | Nammoto ................ | B25J 15/10 |
| | | | | 294/213 |

FOREIGN PATENT DOCUMENTS

| | | |
|---|---|---|
| JP | 3809524 A | 8/2006 |
| JP | 2008-207263 A | 9/2008 |
| JP | 2011-240422 A | 12/2011 |
| JP | 2013-146798 A | 8/2013 |
| JP | 2015-168039 A | 9/2015 |

* cited by examiner

*Primary Examiner* — Dalena Tran
(74) *Attorney, Agent, or Firm* — Canon U.S.A., Inc. IP Division

(57) ABSTRACT

A robot hand according to the present invention controls finger units by a central processing unit (CPU) based on two or more types of gripping mode tables for different purposes when a gripping object is gripped by the finger units.

17 Claims, 21 Drawing Sheets

*300* GRIPPING MODE TABLE

| | GRIPPING MODE | | | | |
|---|---|---|---|---|---|
| GRIPPING DATA NUMBER | CONTROL PROGRAM NUMBER | TYPE OF OBJECT | NUMBER OF FINGER UNITS NECESSARY FOR GRIPPING | CONTROL PROGRAM PRIORITY | REGULATING FINGER POSITION |
| 1 | 1 | WORKPIECE E | 3 OR 2 | 1 | | ~301
| 2 | 2 | WORKPIECE E | 3 OR 2 | 1 | (x1,y1,z1, A1,B1,C1) | ~302

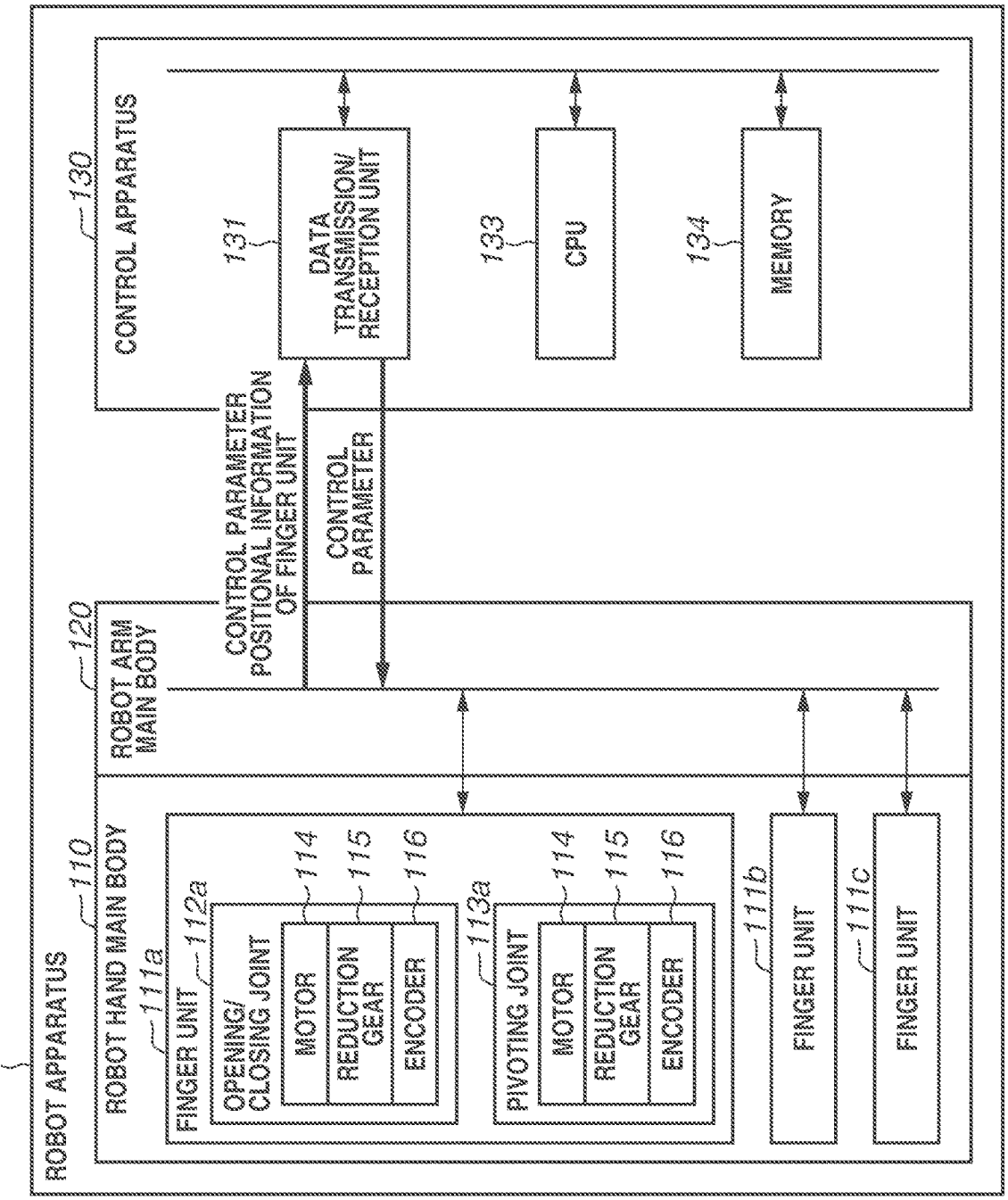

300 GRIPPING MODE TABLE

| GRIPPING DATA NUMBER | CONTROL PROGRAM NUMBER | GRIPPING MODE | | | |
|---|---|---|---|---|---|
| | | TYPE OF OBJECT | NUMBER OF FINGER UNITS NECESSARY FOR GRIPPING | CONTROL PROGRAM PRIORITY | REGULATING FINGER POSITION |
| 1 | 1 | WORKPIECE E | 3 OR 2 | 1 | |
| 2 | 2 | WORKPIECE E | 3 OR 2 | 1 | (x1,y1,z1, A1,B1,C1) |

301 GRIPPING MODE

302 GRIPPING MODE

FIG.11

400 GRIPPING MODE TABLE

| GRIPPING DATA NUMBER | CONTROL PROGRAM NUMBER | GRIPPING MODE ||||
|---|---|---|---|---|---|
| | | TYPE OF OBJECT | NUMBER OF FINGER UNITS NECESSARY FOR GRIPPING | CONTROL PROGRAM PRIORITY | REGULATING FINGER POSITION |
| 1 | 1 | WORKPIECE A | 2 | 2 | (x1,y1,z1, A1,B1,C1) |
| 2 | 2 | WORKPIECE A | 3 | 1 | |
| 3 | 3 | WORKPIECE B | 2 | 2 | (x2,y2,z2, A2,B2,C2) |
| 4 | 4 | WORKPIECE B | 3 | 1 | |
| 5 | 5 | WORKPIECE C | 2 | 2 | (x3,y3,z3, A3,B3,C3) |
| 6 | 6 | WORKPIECE C | 3 | 1 | |

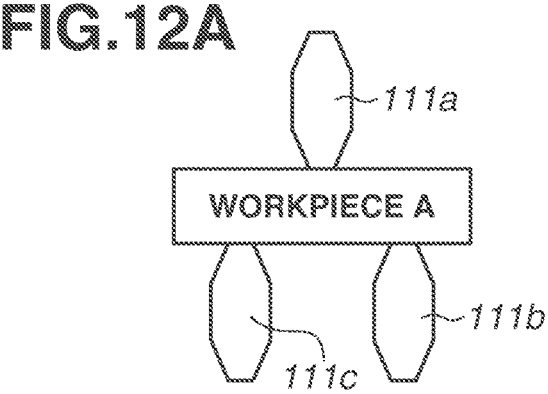
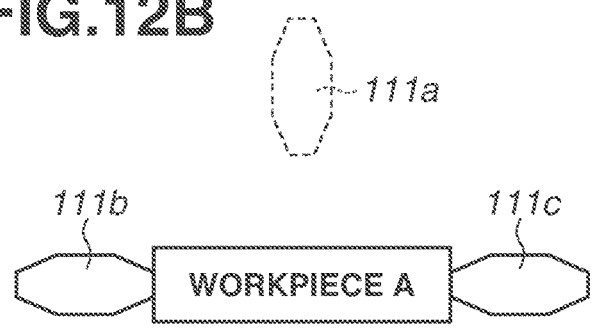
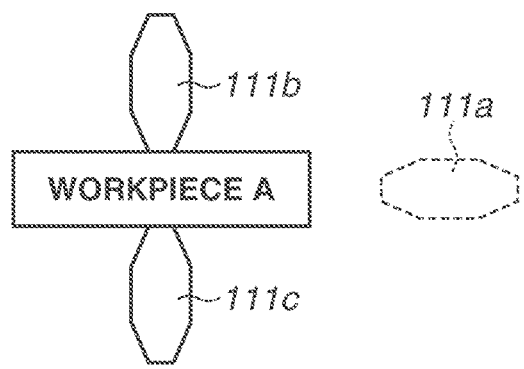
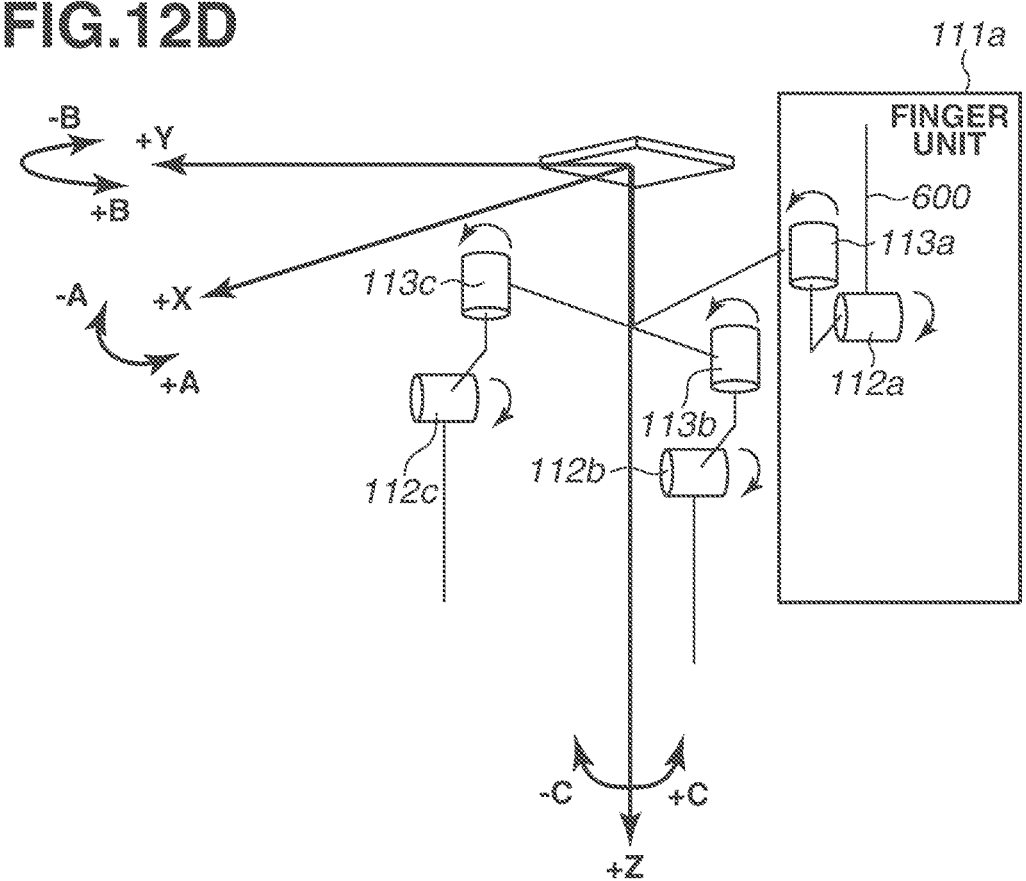

FIG. 14

600 GRIPPING MODE TABLE

| GRIPPING DATA NUMBER | GRIPPING MODE | | | | |
|---|---|---|---|---|---|
| | CONTROL PROGRAM NUMBER | TYPE OF OBJECT | NUMBER OF FINGER UNITS NECESSARY FOR GRIPPING | CONTROL PROGRAM PRIORITY | REGULATING FINGER POSITION |
| 1 | 1 | WORKPIECE A | 2 | 2 | WHEN ABNORMALITY OF FINGER UNIT 111a IS PREDICTED $(x_1, y_1, z_1; A_1; B_1; C_1)$ |
| 2 | 2 | WORKPIECE A | 2 | 2 | WHEN ABNORMALITY OF FINGER UNIT 111b IS PREDICTED $(x_2, y_2, z_2; A_2; B_2; C_2)$ |
| 3 | 3 | WORKPIECE A | 2 | 2 | WHEN ABNORMALITY OF FINGER UNIT 111c IS PREDICTED $(x_3, y_3, z_3; A_3; B_3; C_3)$ |
| 4 | 4 | WORKPIECE A | 3 | 1 | |

FIG. 15

700 GRIPPING MODE TABLE

| GRIPPING DATA NUMBER | CONTROL PROGRAM NUMBER | TYPE OF OBJECT | GRIPPING MODE ||||| 
|---|---|---|---|---|---|---|
| | | | NUMBER OF FINGER UNITS NECESSARY FOR GRIPPING | CONTROL PROGRAM PRIORITY | REGULATING FINGER POSITION 1 | REGULATING FINGER POSITION 2 |
| 1 | 1 | WORKPIECE A | 2 | 2 | (x1,y1,z1, A1,B1,C1) | (x2,y2,z2, A2,B2,C2) |
| 2 | 2 | WORKPIECE A | 3 | 1 | (x1,y1,z1, A1,B1,C1) | |
| 3 | 3 | WORKPIECE B | 2 | 3 | (x3,y3,z3, A3,B3,C3) | (x4,y4,z4, A4,B4,C4) |
| 4 | 4 | WORKPIECE B | 3 | 2 | (x3,y3,z3, A3,B3,C3) | |
| 5 | 5 | WORKPIECE B | 4 | 1 | | |
| 6 | 6 | WORKPIECE C | 2 | 2 | (x5,y5,z5, A5,B5,C5) | (x6,y6,z6, A6,B6,C6) |
| 7 | 7 | WORKPIECE C | 4 | 1 | | |
| 8 | 9 | WORKPIECE D | 2 | 2 | WHEN ABNORMALITY OF FINGER UNIT 111a IS PREDICTED (x1,y1,z1,A1,B1,C1) | |
| 9 | 9 | WORKPIECE D | 2 | 2 | WHEN ABNORMALITY OF FINGER UNIT 111b IS PREDICTED (x2,y2,z2,A2,B2,C2) | |
| 10 | 9 | WORKPIECE D | 2 | 2 | WHEN ABNORMALITY OF FINGER UNIT 111c IS PREDICTED (x3,y3,z3,A3,B3,C3) | |
| 11 | 9 | WORKPIECE D | 2 | 1 | | |

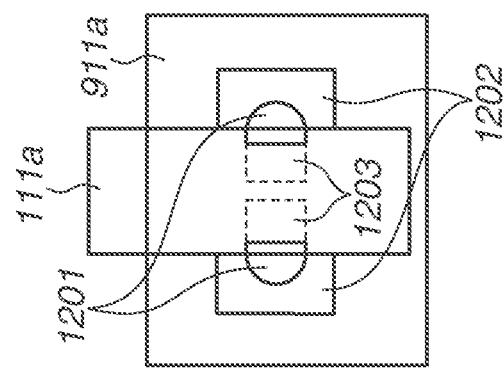
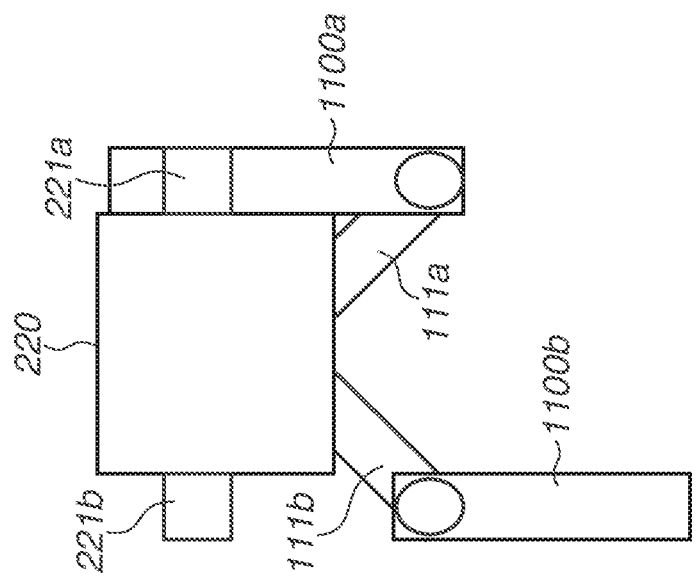
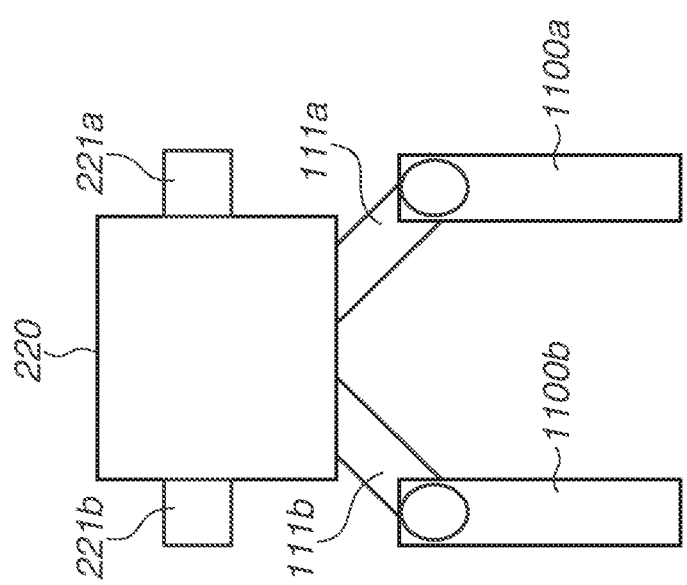

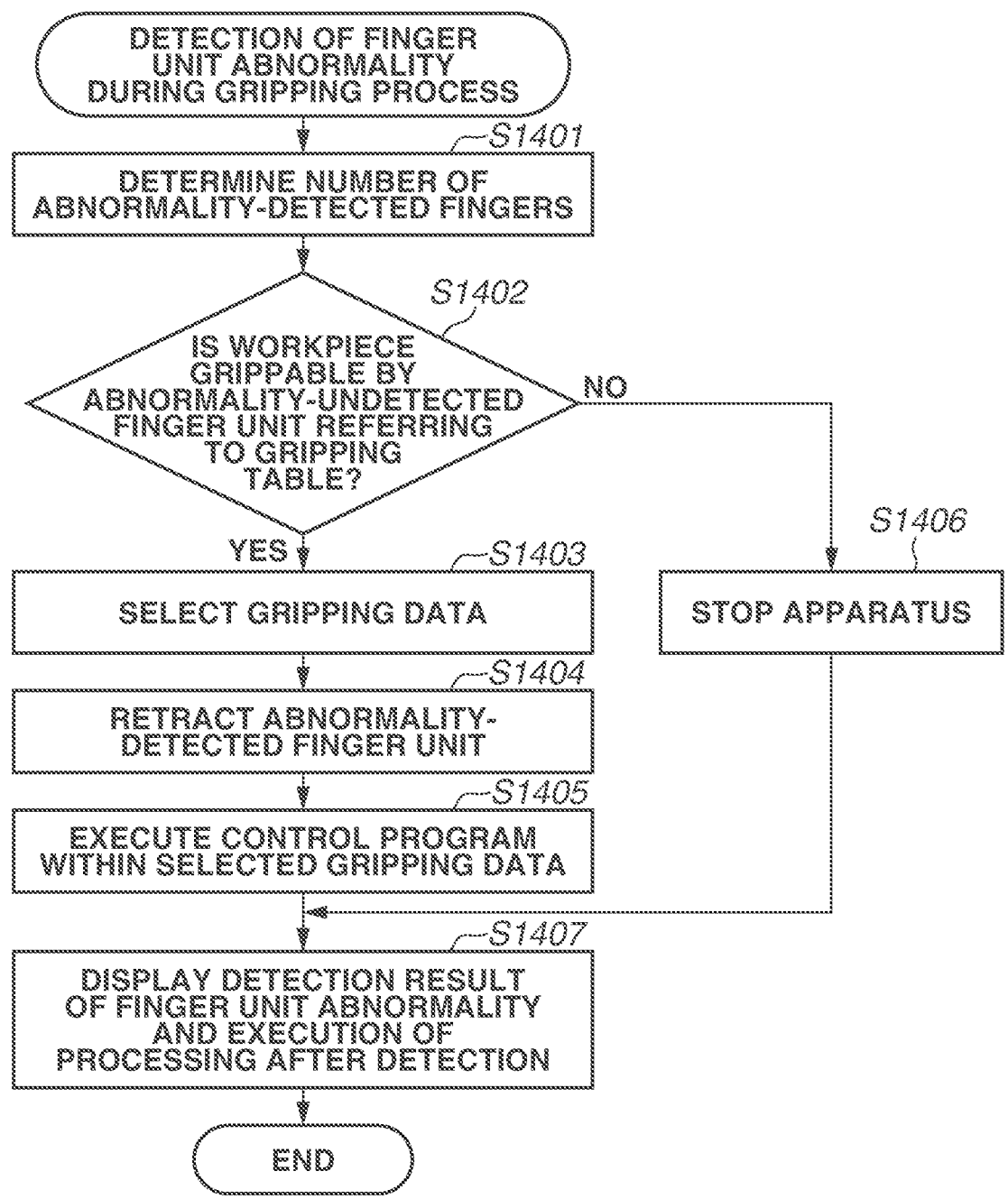

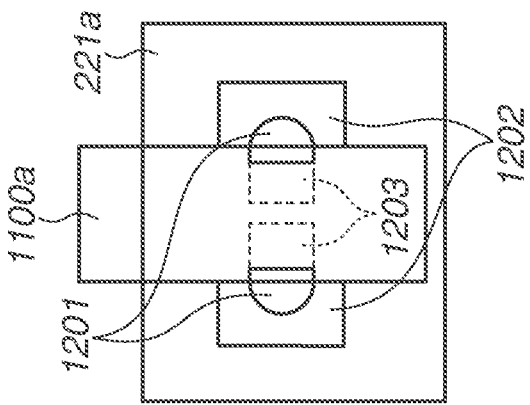
FIG.20C
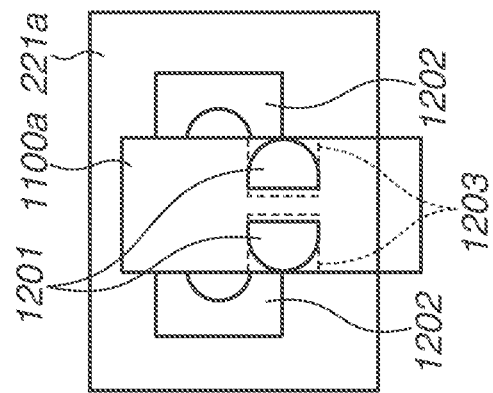
FIG.20B
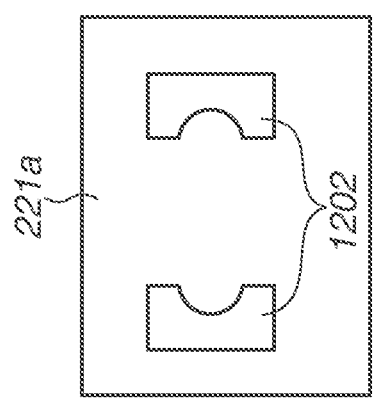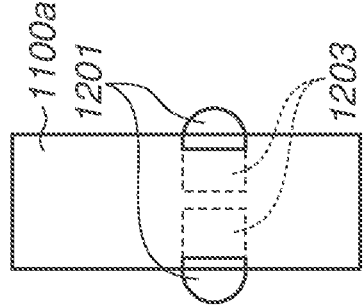
FIG.20A

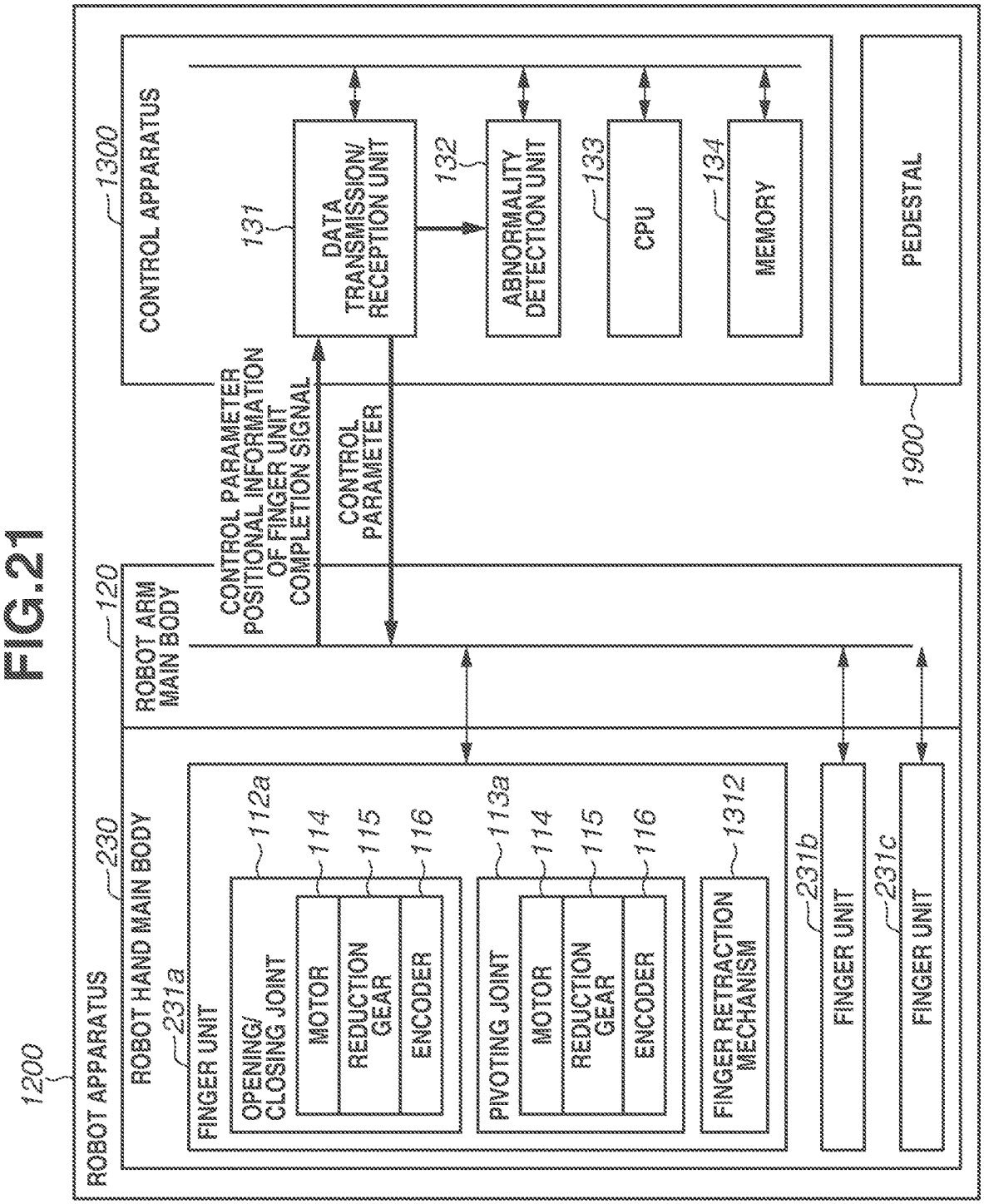

ROBOT HAND, ROBOT APPARATUS, AND METHOD OF CONTROLLING ROBOT HAND

BACKGROUND OF THE INVENTION

Field of the Invention

The present invention relates to a robot hand, a robot apparatus, and a method of controlling a robot hand.

Description of the Related Art

In recent years, a robot apparatus that includes a vertical articulated arm, an end effector, and a control apparatus controlling the vertical articulated arm and the end effector, has been developed. The robot apparatus of this type uses, as the end effector, a robot hand including a plurality of finger units to perform gripping adapted to a plurality of object types.

Japanese Patent Application Laid-Open No. 2013-146798 discusses a technique relating to a robot hand that includes three or more finger units and is flexibly adapted to a position, an attitude, a shape, and the like of a workpiece, by pivoting and moving two or more of the finger units.

According to the technique discussed in Japanese Patent Application Laid-Open No. 2013-146798, gripping actions adapted to a position, an attitude, and a shape of various types of workpieces is performed with use of two or more pivoting finger units; however, Japanese Patent Application Laid-Open No. 2013-146798 does not make reference to the gripping actions adapted to an operation of a robot main body, such as am insert operation. Therefore, in a case where slippage in a direction opposite to an insert direction occurs on the gripped workpiece due to a reaction force in inserting the gripped workpiece, it is necessary for an apparatus according to the technique discussed in Japanese Patent Application Laid-Open No. 2013-146798, to enhance gripping force. The gripped workpiece with weak rigidity, however, may be damaged and positional deviation due to the slippage causes assembling failure, damage of the workpiece, process interruption, etc.

SUMMARY OF THE INVENTION

According to an aspect of the present embodiment, a robot hand that includes three or more finger units and grips an object by the finger units, includes a control unit configured to control the robot hand. The control unit grips the object by the robot hand and uses one or more of the finger units as regulation units. The regulation units regulate the gripped object not to move in a direction opposite to a direction in which the gripped object is moved by the robot hand.

Further features will become apparent from the following description of exemplary embodiments with reference to the attached drawings.

BRIEF DESCRIPTION OF THE DRAWINGS

FIG. 2 is a block diagram illustrating the entire robot apparatus according to the first exemplary embodiment.

FIG. 11 is a diagram illustrating a gripping mode table according to the modification of the first exemplary embodiment.

FIGS. 12A to 12D are schematic diagrams corresponding to the gripping mode table according to the modification of the first exemplary embodiment.

FIG. 14 is a diagram illustrating a gripping mode table of finger units according to a modification of the first exemplary embodiment.

FIG. 15 is a diagram illustrating a gripping mode table in a case where the number of finger units is increased according to a modification of the first exemplary embodiment.

FIGS. 17A to 17C are schematic diagrams of a robot hand main body and a detailed diagram of finger fixing units and finger detection units, according to the second exemplary embodiment.

FIG. 18 is a flowchart of a gripping process according to the second exemplary embodiment.

FIGS. 20 to 20C are schematic diagrams illustrating fixing processing of the finger unit according to the second exemplary embodiment.

FIG. 21 is a block diagram illustrating an entire robot apparatus according to a third exemplary embodiment.

DESCRIPTION OF THE EMBODIMENTS

A robot apparatus and a method of controlling a robot apparatus according to exemplary embodiments are described below with reference to accompanying drawings. The exemplary embodiments described below are merely examples, therefore, a configuration of a small part may be appropriately modified by those skilled in the art without departing from the scope of the embodiments. Further, numerical values to be used in the exemplary embodiments are values for reference purposes and are not intended to be limiting.

Figure 1A:
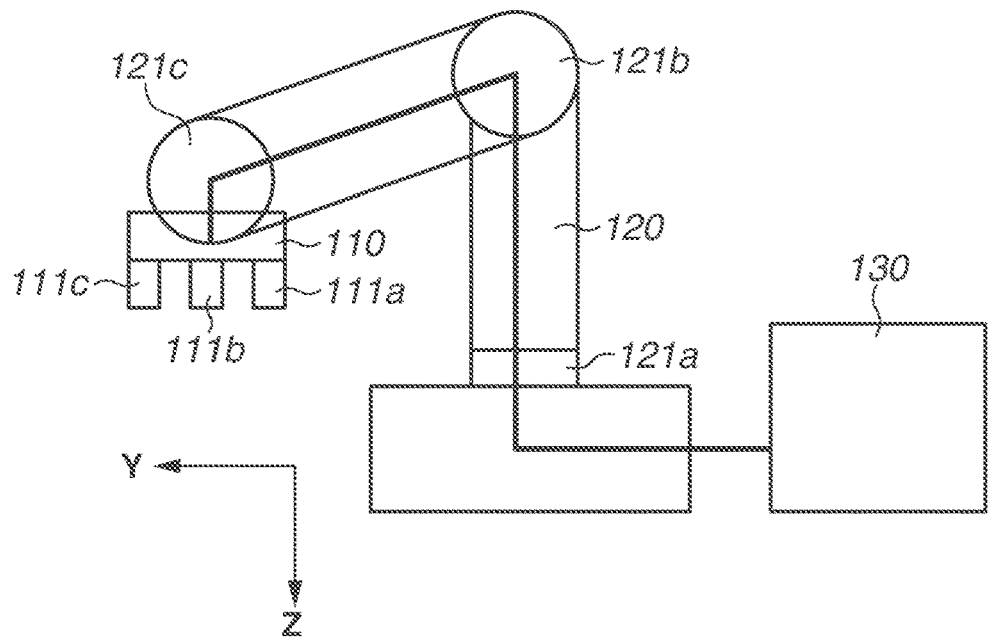
FIGS. 1A and 1B are configuration diagrams schematically illustrating a robot apparatus and a robot hand main body, according to a first exemplary embodiment.
Figure 1B:
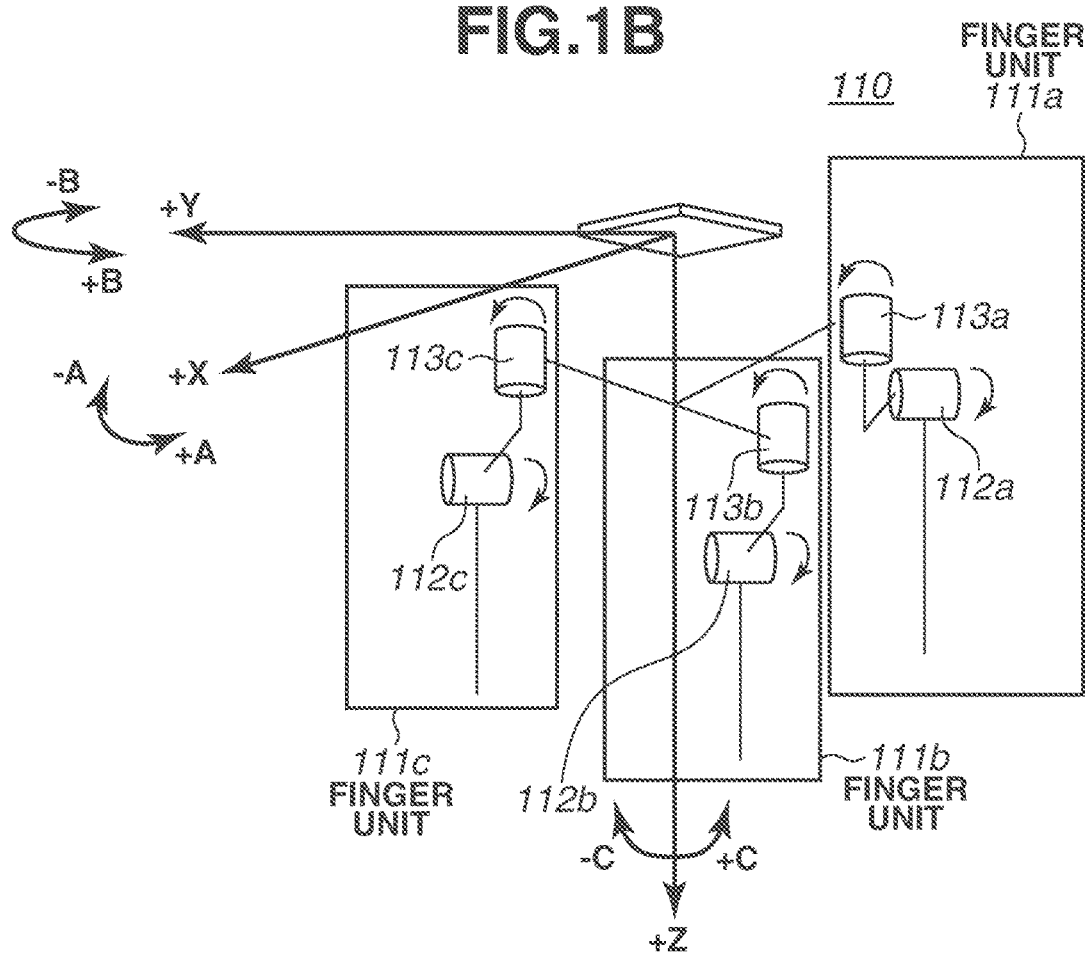

A first exemplary embodiment is described below. FIGS. 1A and 1B are respectively a schematic configuration diagram of a robot apparatus 100 and a schematic configuration diagram of a robot hand main body 110.

The robot apparatus 100 illustrated in FIG. 1A includes the robot hand main body 110, a robot arm main body 120, and a control apparatus 130. The robot arm main body 120 includes the robot hand main body 110 as an end effector that is mounted at a front end in the present exemplary embodiment. An operation is performed on a workpiece through the robot hand main body 110. Further, the robot arm main body 120 includes robot arm joints 121a, 121b, and 121c. Moreover, a motor (not illustrated) serving as a driving source for driving the corresponding joint is provided in each of the joints. The robot arm main body 120 and the robot hand main body 110 are controlled by the control apparatus 130.

As illustrated in FIG. 1B, the robot hand main body 110 includes three finger units 111a, 111b, and 111c. A coordinate system illustrated by heavy lines is a coordinate system (XYZ) of the entire robot hand main body 110. The finger unit 111a includes a driving mechanism (hereinafter, referred to as opening/closing joint) 112a. The opening/closing joint 112a is provided to cause the finger unit 111a, independently from other finger units, to approach one other or to separate from each other, and is used to release and restrain a grip target object. In addition, a pivoting mechanism (hereinafter, referred to as pivoting joint) 113a is provided at a root of the finger unit 111a, and is used to change gripping modes in gripping various gripping objects. The finger units 111b and 111c similarly include opening/closing joints 112b and 112c and pivoting joints 113b and 113c.

FIG. 2 is a control block diagram of the entire robot apparatus 100. In FIG. 2, the opening/closing joints 112a to 112c and the pivoting joints 113a to 113c of the finger units each include a motor 114 serving as a driving source and a reduction gear 115. Further, the opening/closing joints 112a to 112c and the pivoting joints 113a to 113c of the finger units each include an encoder 116 that detects a rotation angle of the corresponding motor 114. The control apparatus 130 includes a data transmission/reception unit 131, a central processing unit (CPU) 133, and a memory 134.

The data transmission/reception unit 131 is a communication interface for the robot hand main body 110 and the robot arm main body 120. The data transmission/reception unit 131 communicates with each of the motors 114 of the robot hand main body 110 and the robot arm main body 120 to transmit and receive a control parameter. The transmitted/received control parameter is developed in a work memory (not illustrated) such as a random access memory (RAM). In the present exemplary embodiment, a driving current is mainly used as the control parameter for the motor 114 of each of the joints.

The control parameter is not limited thereto as long as the parameter relates to the operation of the finger unit and can vary. For example, a grease amount and a grease degradation index of each joint, a rotation angle of the motor of each o finger unit, a torque number, a vibration number, and a stress value of the motor may be handled as necessary.

The CPU 133 controls each of the functional units included in the robot apparatus 100. More specifically, a program stored in the memory 134 is developed on the work memory (not illustrated) such as a RAM, and the CPU 133 executes the developed program to control each of the above-described functional units. In the present exemplary embodiment, each of the above-described functional units may be realized as an operation of the CPU 133. In this case, the program stored in the memory 134 includes functions of the above-described respective functional units.

The memory 134 stores the control parameters used in the respective functional units constituting the robot apparatus 100, and control programs of a robot hand main body and a robot arm main body executed by the CPU 133. In the present exemplary embodiment, the control programs are respectively associated with gripping modes described later, and are stored as a griping mode table in the memory 134.

Figure 3:
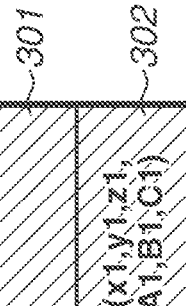
FIG. 3 is a diagram illustrating a gripping mode table according to the first exemplary embodiment.

FIG. 3 illustrates a gripping mode table 300 according to the present exemplary embodiment. In the present exemplary embodiment, a gripping data number for identifying and managing a gripping mode is provided. One gripping mode (301 or 302) includes a control program number, a type of object, a number of finger units necessary for gripping, control program priority, and a regulating finger position to prevent slippage of the gripping object as its elements.

The gripping data number is used for selection of a row element of the gripping mode table 300. In other words, the gripping data number is used for selection of a gripping mode, and the gripping mode is determined through selection of the gripping data number. In the present exemplary embodiment, control data for two types of gripping modes represented by gripping data numbers 1 and 2 is stored.

The control program number is represented by a numerical value uniquely indicating a control program for execution of a gripping process according to the present exemplary embodiment. The type of object indicates a type of object to be gripped by the robot hand main body 110. In the present exemplary embodiment, a workpiece E is handled.

The number of finger units necessary for gripping is the number of finger units necessary to grip an object. In the present exemplary embodiment, the number of finger units necessary for gripping is three or less because the robot hand main body 110 includes the three finger units. In addition, it is assumed that an object cannot be gripped by only one finger unit. Accordingly, a numerical value of 3 or 2 is set as the number of finger units necessary for gripping.

The regulating finger position is used in a gripping mode in which one or more finger units are used as regulating fingers in inserting the gripped object in order to prevent slippage of the gripped object in a direction opposite to an insertion direction, in a case where the gripped object is inserted into another object. The regulating finger position in the present exemplary embodiment is a position which does not influence (not interfere with) operation such as gripping and movement by the finger units other than the regulating fingers.

In addition, the regulating finger position is represented by set values (X, Y, Z, A, B, and C) that are previously taught through movement of the robot hand main body 110, while using a coordinate system of the entire robot hand main body 110 illustrated by thick arrows in FIG. 1B, In the present exemplary embodiment, the values X, Y, and Z are represented by position coordinates, and the values A, B, and C are represented by a rotation angle.

The components and the contents of the elements in the gripping modes in the gripping mode table 300 are not limited to those described above. For example, a control program may be prepared, for each object, and the regulating finger position may be separately set in the control program.

The gripping operation of the robot apparatus 100 according to the present exemplary embodiment is described in detail below. In the present exemplary embodiment, the workpiece E is subjected to two types of processes as the object, namely, a conveying process to another position and an inserting process into another object workpiece E'.

Figure 4A:
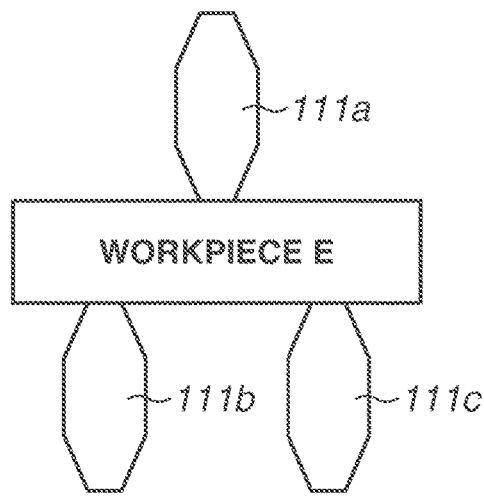
FIGS. 4A to 4C are schematic diagrams corresponding to the gripping mode table according to the first exemplary embodiment.
Figure 4B:
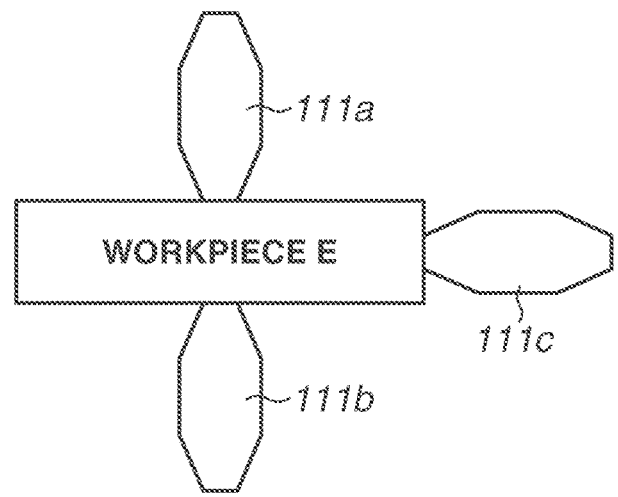
Figure 4C:
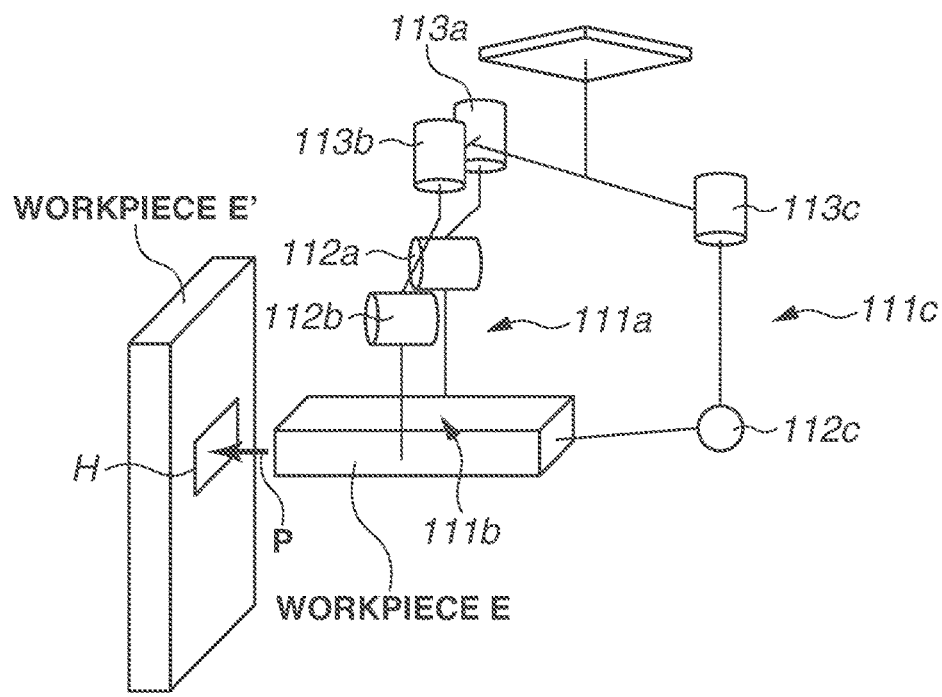

FIGS. 4A to 4C are schematic diagrams each illustrating the object (workpiece E) corresponding to a gripping mode and a state of the robot hand main body 110. FIG. 4A illustrates an example in which a control program of the gripping mode 301 represented by the gripping data number 1 is executed and the workpiece E is evenly gripped. Further, FIG. 4B illustrates an example in which a control program of the gripping mode 302 represented by the gripping data number 2 is executed to grip the workpiece E by the finger units 111a and 111b, and the finger unit 111c functions as a regulation unit that regulates movement of the workpiece E in order to prevent slippage of the workpiece E in a direction opposite to the insertion direction due to reaction force received when the workpiece E is inserted into the workpiece E'.

FIG. 4C is a perspective view illustrating the robot hand main body 110 and the workpiece E in carrying out the insertion illustrated in FIG. 4B. The workpiece E is inserted into a fitting hole H of the workpiece E' in an arrow P direction. At this time, the finger unit 111c functions as the regulation unit to prevent slippage of the workpiece E in the direction opposite to the insertion direction. In other words, the workpiece E is gripped by the finger units 111a and 111b, and the finger unit 111c does not contribute to the gripping. Thus, the workpiece E includes two different types of gripping modes depending on the operation condition and the like of the robot apparatus 100.

Figure 5:
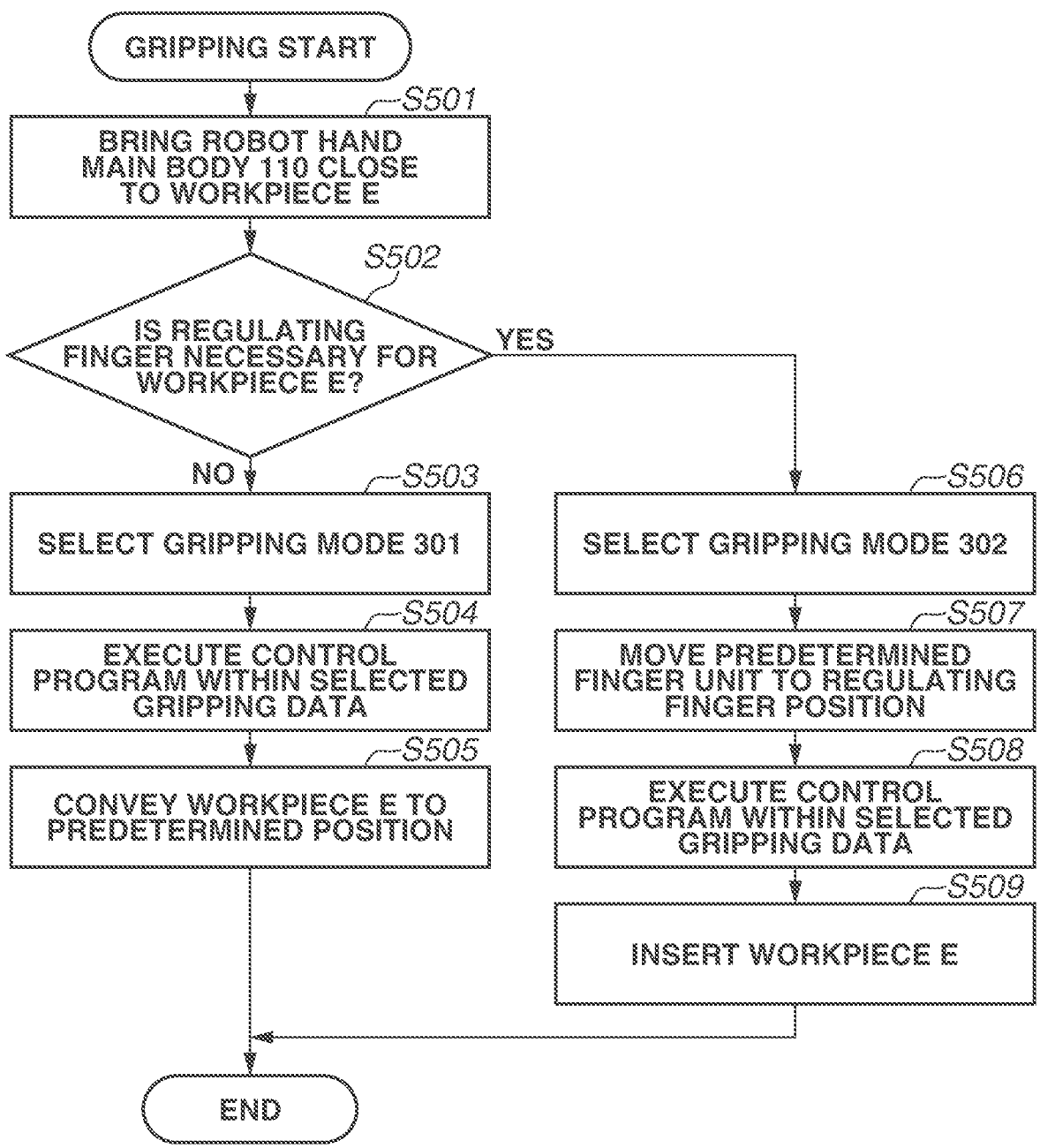
FIG. 5 is a flowchart of gripping processing according to the first exemplary embodiment.

FIG. 5 is a flowchart for gripping processing of the finger units 111a to 111c with respect to the workpiece E according to the present exemplary embodiment. The workpiece E is first selected as the object, and whether to use the regulating finger with respect to the workpiece E is set during a teaching process according to the shape of the workpiece E and the contents of assembling work, or at the time of programing the working process.

In addition, the control parameter is transmitted/received between the control apparatus 130 and both of the robot hand main body 110 and the robot arm main body 120 at a predetermined interval by the data transmission/reception unit 131 functioning as the interface. The control illustrated in the flowchart of FIG. 5 is executed by the CPU 133.

First, the robot hand main body 110 is moved, by the robot arm main body 120, to a position immediately before the gripping of the workpiece E (step S501).

In step S502, it is determined whether the regulate finger is necessary for the workpiece E. When the regulating finger is necessary (YES in step S502), the processing proceeds to step S506 (insertion operation). When the regulating finger is unnecessary (NO in step S502), the processing proceeds to step S503 (conveyance operation).

In the present exemplary embodiment, the insertion operation is described as an example for the case where the regulating finger is necessary for the workpiece E, and the conveyance operation is described as an example for the case where the regulating finger is unnecessary, for convenience of description; however, various works are actually possible depending on the processes. Therefore, in step S502, various processing is performed according to the works. It is assumed that whether the regulating finger is necessary for the work is set at the time of the teaching operation or at the time of programing the work processes.

In a case where it is determined in step S502 that the regulating finger is unnecessary for the workpiece E (NO in step S502), the control program of the gripping data number 1 is selected from the gripping mode table 300 illustrated in FIG. 3. In other words, the gripping mode 301 (FIG. 4A) is selected.

Thereafter, the CPU 133 selects the gripping data number 1 from the gripping mode table 300, and reads out the control program corresponding to the gripping mode 301 from the memory 304 (step S503).

Then, the CPU 133 develops the read control program in the unillustrated work memory, executes the control program 1 of the gripping mode 301, and performs gripping (FIG. 4A) by the finger units 111a to 111c (step S504).

In step S505, the workpiece E is conveyed to the predetermined position and the gripping operation then ends. The predetermined position is a position set by a teaching person, and is determined based on an output from an encoder that is mounted on the robot arm main body 120 and detects a rotational axis of an unillustrated motor or a rotation position of a driving transmission system of the joint.

In a case where it is determined in step S502 that the regulating finger is necessary for the workpiece E (YES in step S502), the control program of the gripping data number 2 is selected from the gripping mode table 300 illustrated in FIG. 3. In other words, the gripping mode 302 (FIG. 4B) is selected.

Then, the CPU 133 selects the gripping data number 2 from the gripping mode table 300, and reads out the control program corresponding to the gripping mode 302 from the memory 134 (step S506).

Next, the CPU 133 moves the finger unit 111c to the regulating finger position (FIGS. 4B and 4C) of the gripping mode 302. At this time, the CPU 133 moves all of the finger units 111a, 111b, and 111c to respective origin positions once. Thereafter, the CPU 133 moves the finger unit 111c to a regulating finger position (X1, Y1, Z1, A1, B1, and C1) that is represented by previously-taught coordinate values and rotation angle to complete the movement of the finger unit 111c (step S507).

Next, the CPU 133 executes the control program 2 of the gripping mode 302, and performs gripping (FIGS. 4B and 4C) by the finger units 111a to 111c (step S508).

The CPU 133 executes the control program to perform insertion while regulating, by the regulating finger unit 111c, the position of the workpiece E with respect to each of the finger units in order to prevent slippage of the workpiece E in the direction opposite to the insertion direction due to reaction force (step S509). The workpiece E is then inserted into the workpiece E', and the operation ends.

In the present exemplary embodiment, the insertion of the workpiece E is assisted at the regulating finger positions (X1, Y1, Z1, A1, B1, and C1) that are preset in the gripping mode 302; however, the regulating finger position is not limited thereto. For example, the regulating finger position may be dynamically changed according to positions of the other fingers.

Figure 6A:
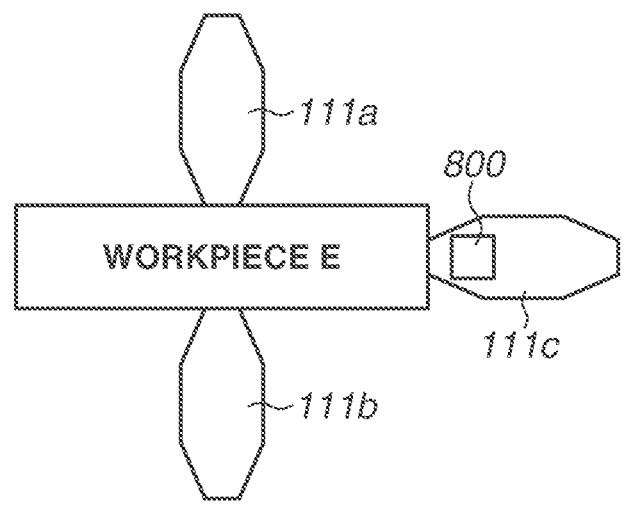
FIGS. 6 and 6B are diagrams of a gripping mode in a case where a force detection unit is provided in a regulating finger according to the first exemplary embodiment.
Figure 6B:
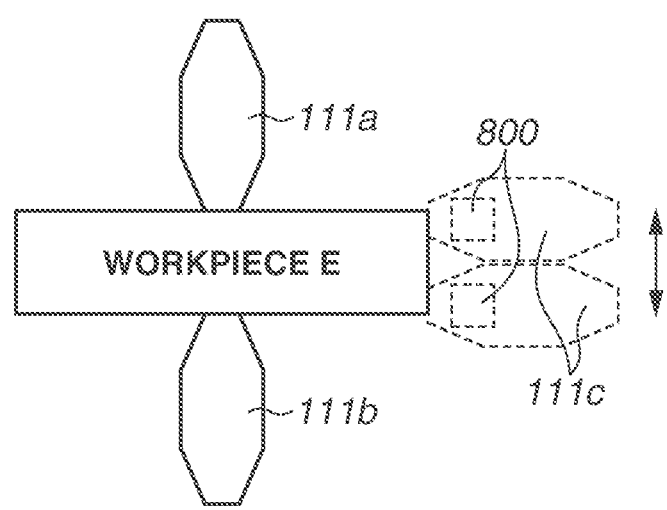

In that case, as illustrated in FIG. 6A, a force detection unit 800 that detects reaction force is provided at a fingertip of the regulating finger unit 111c. If a value detected by the force detection unit 800 is equal to a predetermined value, a position where the regulating finger unit 111c and the workpiece E come into contact with each other may be shifted in a direction of decreasing the detected value to effectively assist the insertion of the workpiece E, as illustrated in FIG. 6B.

Figure 7:
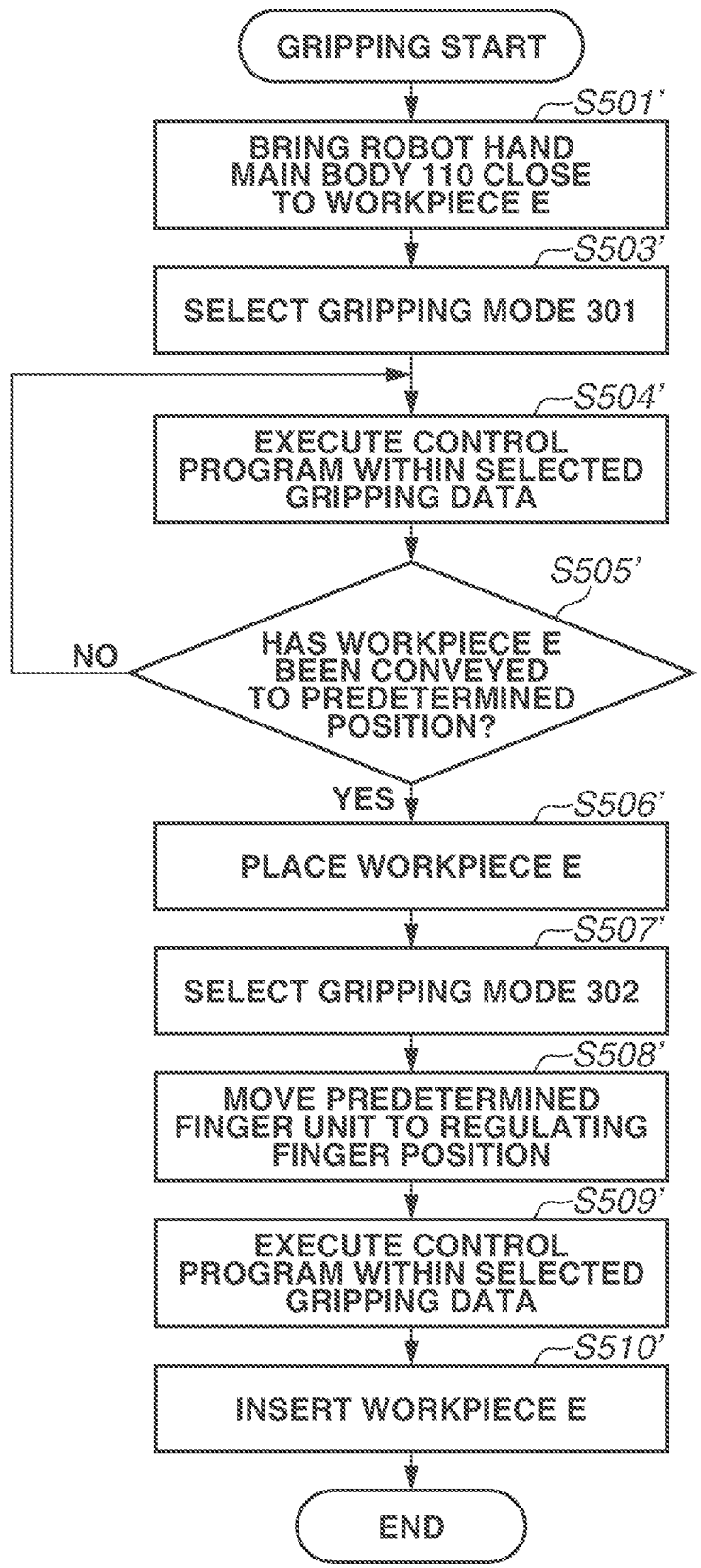
FIG. 7 is a flowchart illustrating switching of the gripping mode in the gripping processing according to the first exemplary embodiment.

Switching of the gripping mode described above is performed according to the setting by the teaching person (step S502). Alternatively, the gripping mode may be switched to the gripping mode 302 on a condition that the workpiece E is conveyed to the predetermined position in the gripping mode 301. FIG. 7 is a flowchart in that case. Each of the step numbers is added with a single quotation mark for distinction from the step number in FIG. 5.

FIG. 7 is largely different from FIG. 5 in that step S502 is removed and switching condition of the gripping mode is determined in step S505'.

In step S505', it is determined whether the workpiece E has been conveyed to the predetermined position in the gripping mode 301. When a determination result is NO in step S505' (NO in step S505'), the conveyance operation is repeated again. When a determination result is YES in step S505' (YES in step S505'), the workpiece E is placed on the predetermined position in step S506', the gripping mode 302 is selected in step S507', and the insertion operation of the workpiece E is performed.

As a result, the conveyance operation and the insertion operation of the workpiece E are successively performed, which improves production efficiency.

Figure 8A:
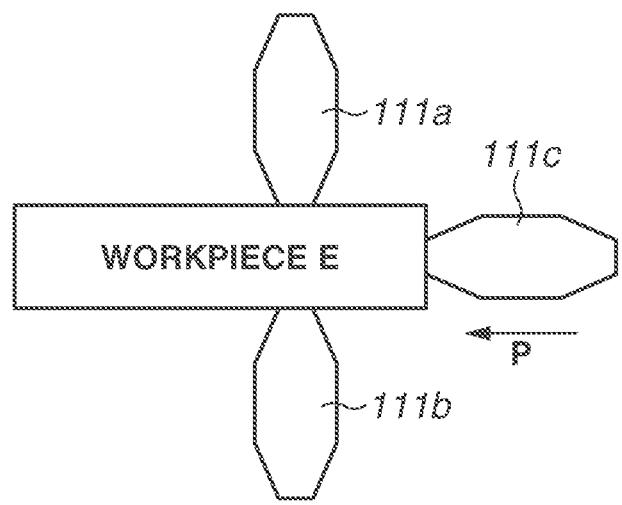
FIGS. 8A and 8B are diagrams of a gripping mode in a case where a gripped object is pushed into another object by the regulating finger according to the first exemplary embodiment.
Figure 8B:
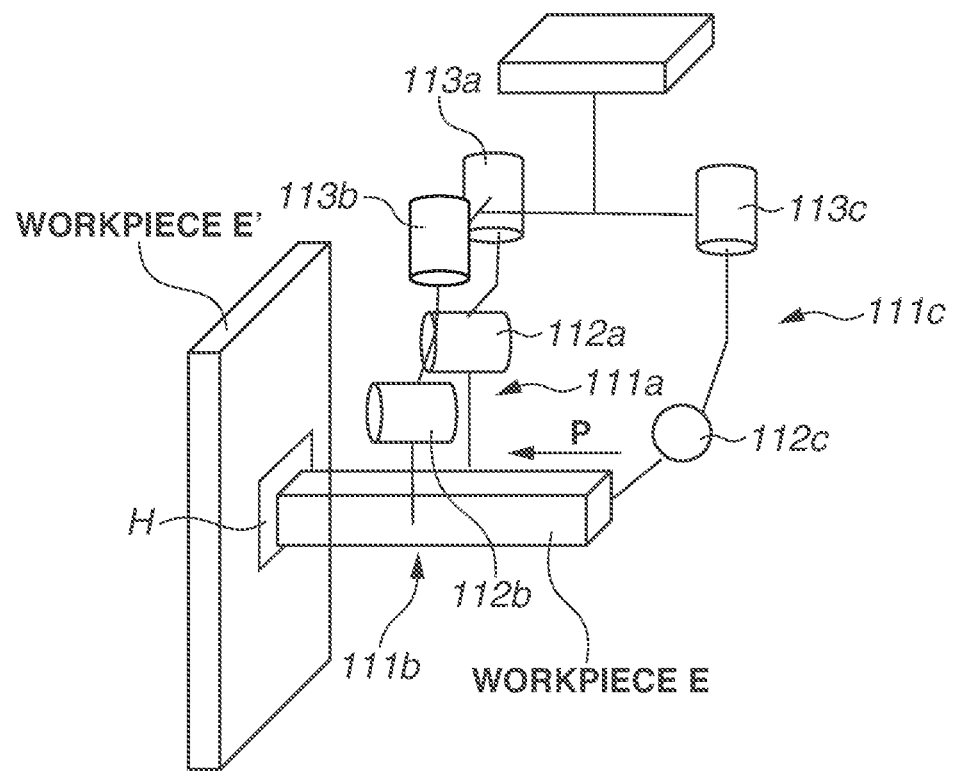

In addition, the workpiece E may be pushed into the workpiece E' by the regulating finger unit 111c. FIG. 8A is a schematic diagram of the gripping mode in that case, and FIG. 8B is a perspective view thereof.

In the present exemplary embodiment, the workpiece E is moved and the insertion operation is performed by the robot hand main body 110. Deviation may be caused by vibration, for example, coming from a mechanism constituting the robot hand main body 110. Pushing the workpiece E into the workpiece E' by the regulating finger unit 111c, however, cancels the vibration caused by operation of the robot hand main body 110, which allows for highly accurate insertion operation.

Figure 9A:
FIGS. 9A and 9B are diagrams of a gripping mode in a case where the gripped object is regulated in a gravity direction according to the first exemplary embodiment.
Figure 9B:
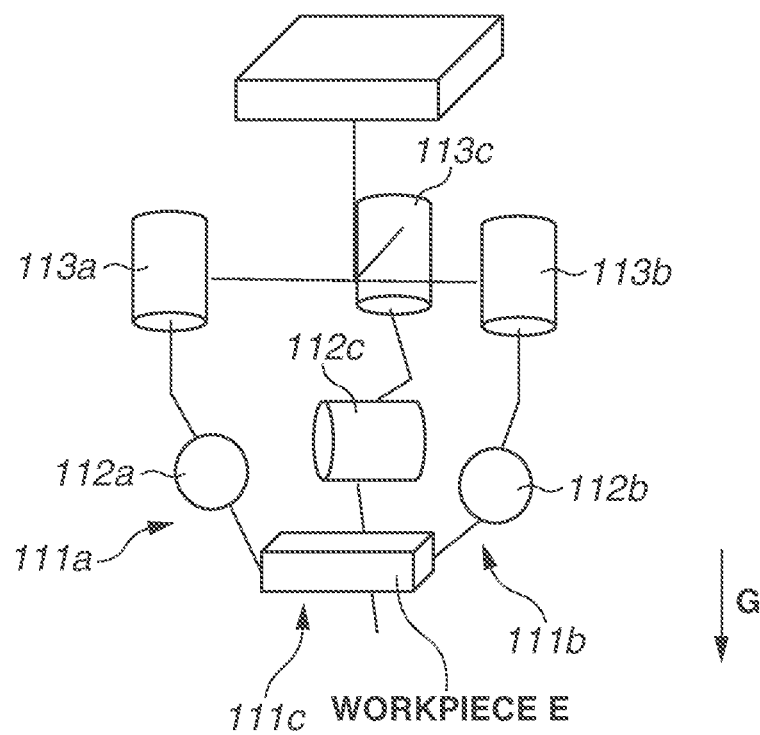

Movement of the workpiece E in the incorporating operation of the workpiece E is regulated in the above description; however, the regulation is not limited thereto. FIGS. 9A and 9B illustrate the workpiece E, which is gripped by the robot hand main body 110 and movement of the workpiece E in a gravity direction G is regulated by the finger unit 111c when the workpiece E is lifted up.

As Illustrated in FIGS. 9A and 9B, the finger unit 111c is disposed on lower side of the workpiece E. This regulates the movement of the workpiece E in the gravity direction G due to inertia when the workpiece E is lifted up at high speed. This makes it possible to further accelerate conveyance of the workpiece E.

In addition, the finger unit 111c is used as the regulating finger in the above-described control method; however, the finger units 111a and 111b may be used as the regulating fingers depending on use application. In that case, the gripping mode in which information of the regulating finger position is associated with the finger units 111a and 111b is previously stored in the gripping mode table 300.

Furthermore, an imaging apparatus (not illustrated) may be provided on the robot apparatus 100, and the regulating finger position may be appropriately changed according to the workpiece to be gripped.

In the present exemplary embodiment, a description is limited to the gripping process; however, the process is not limited thereto as long as the position of the object is moved with use of the plurality of finger units. For example, the present exemplary embodiment is applicable to a holding process and an adsorption process of the object.

In the above-described holding process, unlike the gripping, the object is moved without being gripped. Accordingly, if the gripping is replaced with holding, the conveyance process for placing a plate-like object is possible. Description of a holding mechanism is omitted because the holding mechanism is not a main subject of the embodiments. For example, a holding mechanism discussed in Japanese Patent Application Laid-Open No. 2008-207263 may be used.

In the case of the adsorption process, by providing an adsorption unit or a cylinder assembly (not illustrated) in each of the finger units 111a to 111c, the gripping described in the present exemplary embodiment can be replaced with the adsorption, and the adsorption process may be performed. Description of an adsorption mechanism is omitted because the adsorption mechanism is not a main subject of the embodiments. For example, an adsorption mechanism discussed in Japanese Patent Application Laid-open No. 2015-168039 may be used.

In addition, it is readily conceivable that the gripping, the holding, and the adsorption are combined and used in the movement process of the object.

According to the present exemplary embodiment described above, it is possible to selectively use not only the gripping mode dealing with the position, the attitude, and the shape of the object but also selectively use the gripping mode dealing with the operation of the robot main body, such as insertion. As a result, it is possible to reduce slippage without gripping the object with strong gripping force. This makes it possible to perform assembly with high accuracy while reducing possible damage of the workpiece, and to perform flexible gripping such as switching the holding of the workpiece.

Further, the three finger units have been described in the above-described exemplary embodiment; however, the number of the finger units is not limited thereto, and may be four or more.

Modifications

In the above-described exemplary embodiment, the flexible gripping is performed by selectively using the gripping mode corresponding to the assembling operation by the robot main body such as insertion of the object. However, the embodiments can be not only applied to the assembling operation but also to a case where abnormality occurs on any of the finger units.

For example, if abnormality occurs on a part of the finger units of the robot hand main body, by changing a control value relating to the abnormal finger unit, the operation can be continued. In the technique discussed in Japanese Patent Application Laid-Open No. 2013-146798, however, the abnormally driving finger is involved in the gripping process because all of the fingers are opened or closed in conjunction with one another. As a result, even if an object can be gripped by only two pivoting fingers, it is necessary to stop the entire robot apparatus to repair the relevant finger unit, which impairs an operating rate of the apparatus.

Therefore, a method of controlling the gripping operation to selectively use the corresponding gripping mode when an abnormality occurs on any of the finger units will be described.

Figure 10:
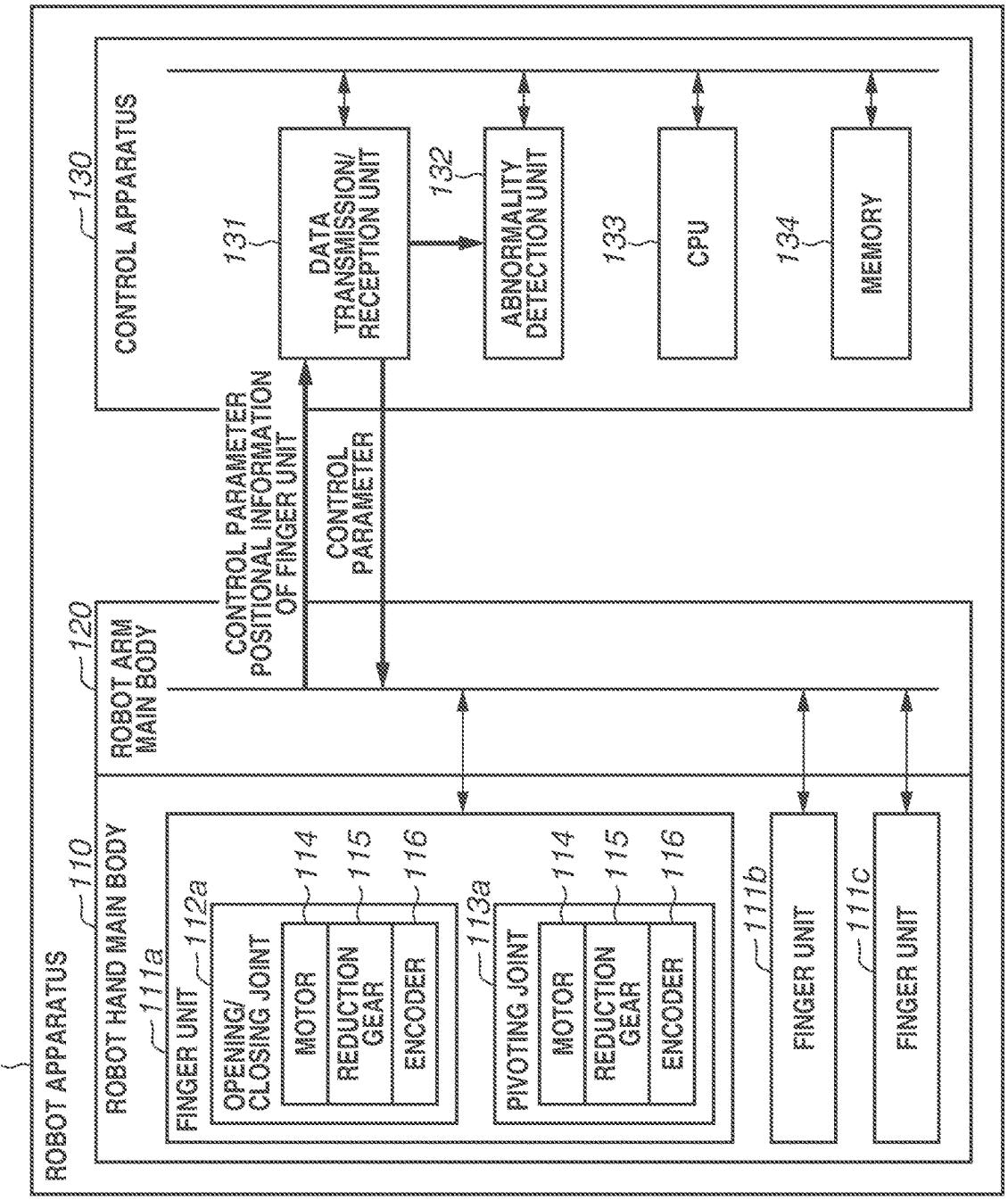
FIG. 10 is a block diagram illustrating an entire robot apparats according to a modification of the first exemplary embodiment.

FIG. 10 is a control block diagram of the entire robot apparatus 100 for execution of the above-described control method, in a form similar to that in FIG. 2. A difference from the exemplary embodiment for insertion of the object is that an abnormality detection unit 132 is provided in the control apparatus 130. Detailed description is given below.

The abnormality detection unit 132 detects an abnormality of the robot hand main body 110 and an abnormality of the robot arm main body 120. More specifically, the abnormality detection unit 132 compares a threshold of the control parameter stored in the memory 134 with the control parameter transmitted to the robot hand main body 110 and the robot arm main body 120, thereby detecting abnormality of the robot hand main body 110 and the robot arm main body 120.

Further, the abnormality detection unit 132 compares the control parameters transmitted to the robot hand main body 110 and the robot arm main body 120 with a control parameter received from each of the robot hand main body 110 and the robot arm main body 120, thereby detecting abnormality of the robot hand main body 110 and abnormality of the robot arm main body 120.

Furthermore, a threshold (hereinafter, referred to as abnormality detection threshold) indicating an allowable value of a difference between a target value of driving current to be supplied to the motor 114 of the finger units 111a to 111c and an actual current actually flowing through the motor 114 of the finger units 111a to 111c is previously stored in the memory 134.

The target value of driving current is a current value necessary to cause the motor 114 to output, for example, a certain torque or a certain rotation speed. The current actually flowing through the motor 114 is taken into the control apparatus through an analog-to-digital (AD) converter, and is compared with the target value of driving current to determine the operation state.

In a case where the difference between the target value of driving current of the motor and the current actually flowing through the motor exceeds the abnormality detection threshold, the abnormality detection unit 132 detects abnormality of the motor 114.

FIG. 11 illustrates a gripping mode table 400 when abnormality of any of the finger units is detected. The gripping mode table 400 includes, as the elements of the gripping mode, the gripping data number, the control program number, the type of object, the number of finger units necessary for gripping, the control program priority, and a finger unit retracting position when abnormality of any of the finger units is detected.

The gripping data number is used for selection of a row element of the gripping mode table 400. In other words, by selecting the gripping data number, the corresponding gripping control program and the necessary gripping data can be specified, which provides six types of gripping control programs represented by the gripping data numbers 1 to 6. The control program number is represented by a numerical value uniquely indicating a control program for execution of a gripping process, and is set to a numerical value corresponding to the gripping data number.

The type of object indicates an object type to be gripped by the robot hand main body 110. In the present case, a workpiece A, a workpiece B, and a workpiece C are handled.

The number of finger units necessary for gripping indicates the number of finger units necessary to grip a plurality of object types. The number of finger units necessary for gripping is three or less because the robot hand main body 110 includes the three finger units. In addition, it is assumed that an object cannot be gripped by only one finger unit. Accordingly, a numerical value of 3 or 2 is set as the number of finger units necessary for gripping.

The control program priority is a numerical value indicating which control program is preferentially selected in the gripping mode table 400 in a case where control is performed on the same object. The control program with lower numerical value is preferentially selected. In addition, the number of the finger units necessary for gripping is set differently for each control program.

The finger unit retracting position indicates, in a case where the abnormality detection unit 132 detects abnormality of any of the finger units, a position to which the finger unit in which the abnormality is detected is retracted. The finger unit retracting position is a position which does not influence an operation such as gripping and movement to be performed by remaining normally-operable finger units in the case where the finger unit in which the abnormality is detected, is moved to the finger unit retracting position.

The finger unit retracting position is represented by position setting values (X, Y, Z, A, B, and C) that are previously taught through movement of the robot hand main body 110, using the coordinate system of the entire robot hand main body 110 illustrated by the thick arrows in FIG. 1B. The values X, Y, and Z are position coordinates, and the values A, B, and C are rotation angles.

The composing elements and the contents of the elements in the gripping mode table 400 are not limited to those described above. For example, a control program may be prepared for each gripping object, and the finger unit retracting position may be separately defined in the control program.

The gripping operation of the robot apparatus 100 when an abnormality occurs on the finger units is described in detail below. The workpiece A as the object goes into a gripping mode for a case where no finger unit is in an abnormal state and goes into a gripping mode for a case where the finger units are in the abnormal state.

In this example, a case is described where abnormality of the motor 114 of the opening/closing joint 112a inside the finger unit 111a is detected during the gripping process of the workpiece A as the object. In this case, the motor 114 acquires the predetermined target value of a driving current from the control apparatus 130. It is assumed that the actual current flowing through the motor 114 is small and it is detected that the rotation speed of the motor 114 is insufficient. In other words, it is assumed that while the finger units 111a, 111b, and 111c are individually operable by the motors 114 of the respective finger units, the motor 114 of the finger unit 111a cannot output a desired value and gripping of the object becomes impossible in the feature. The positional information of the finger units 111a, 111b, and 111c is detectable by the encoders 116 of the respective finger units.

FIGS. 12A to 12D are schematic diagrams each illustrating the gripping state of the object (workpiece A) corresponding to detected abnormality. FIG. 12A illustrates an example in which the gripping mode corresponds to the normal state of the finger units, a control program of a gripping mode 402 is executed, and the workpiece A is gripped. Further, FIGS. 12B and 12C each illustrate an example in which the gripping mode corresponds to the detected abnormality of the finger unit, a control program of a gripping mode 401 is executed, and the workpiece A is gripped. As illustrated in FIGS. 12B and 12C, as the gripping mode corresponding to the detected abnormality of the finger unit, there is a plurality of gripping modes. The finger unit retracting position is set for each of the finger units, and the abnormality-detected finger unit is moved to the retracting position.

An operation speed of the robot hand main body 110 and an operation speed of the robot arm main body 120 instructed by the control program corresponding to the gripping mode 401 are made lower than those by the control program corresponding to the gripping mode 402. This allows for stable gripping conveyance operation although it does not reach a level of the gripping mode 402 even in a case where the number of the gripping fingers is small.

Whether the program is placed in the gripping mode illustrated in FIG. 12B or FIG. 12C is appropriately selected depending on a working condition of the robot hand.

FIG. 12D is a schematic diagram illustrating a retracted state of the finger unit 111a. The gripping state illustrated in FIG. 12B or FIG. 12C is entered in a state of FIG. 12D. In FIG. 12D, a Z component Z1 of the finger unit retracting position is previously taught in a negative direction of the Z axis in the above-described coordinate system, to operate the opening/closing joint 112a of the finger unit 111a. As a result, it is possible to retract a front-end element 200 of the finger unit 111a to a position which does not influence the gripping by the other finger units. As described above, the workpiece A has two or more types of gripping modes for different purposes.

Figure 13:
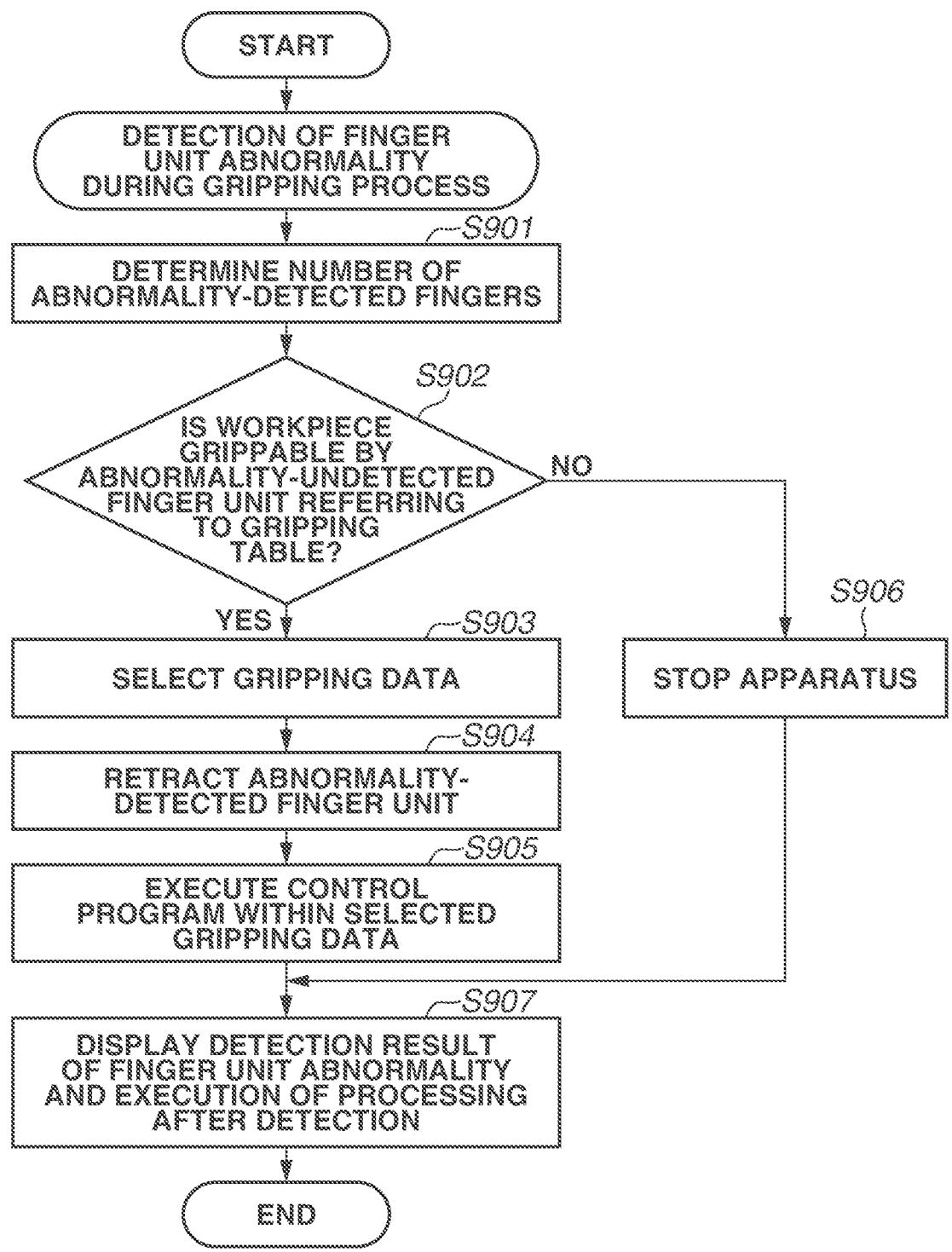
FIG. 13 is a flowchart of gripping processing according to the modification of the first exemplary embodiment.

FIG. 13 is a flowchart relating to gripping continuation processing that is operated when abnormality of the finger units 111a to 111c is detected. It is assumed that the workpiece A is first selected as the gripping object and abnormality of the finger units is not detected. Further, the gripping mode 402 of the gripping data number 2 is selected based on the control program priority that is the element of the gripping mode illustrated in FIG. 11, and the gripping process is performed by the corresponding control program.

The control parameter is transmitted/received between the control apparatus 130, and both of the robot hand main body 110 and the robot arm main body 120 at a predetermined interval using the data transmission/reception unit 131 as the interface.

When the abnormality detection unit 132 detects abnormality of any of the finger units 111a to 111c, the flow of the gripping continuation processing illustrated in FIG. 13 is started. First, the abnormality detection unit 132 acquires, from the data transmission/reception unit 131, the actual current in the motor 114 and the driving current target value of the motor 114 of the finger units 111a to 111c that are control parameters. In the following, it is assumed that the abnormality of the finger unit 111a has been detected.

If it is determined that the difference between the driving current target value of the motor 114 of the finger unit 111a and the actual current of the motor 114 is larger than a difference threshold of detected current abnormality saved in the memory 134, the relevant flow is started. At the same time, information indicating the detection of abnormality (hereinafter, referred to as abnormality detection information) is stored in the memory 134. The abnormality detection information is binary information provided for each of the finger units. A value of one is stored as the abnormality detection information when abnormality is detected, and a value of zero is stored as the abnormality detection information when no abnormality is detected.

The CPU 133 acquires information for abnormality detection (abnormality detection threshold) from the memory 134. The CPU 133 then detects the finger unit in which the abnormality is detected based on the information for abnormality detection. In the present case, since abnormality of the finger unit 111a has been detected, a value of one is stored in the abnormality detection information of the finger unit 111a. The CPU 133 counts the number of finger units that store the value of one in the abnormality detection information, and determines that the number of abnormality-detected fingers is one (step S901).

Next, the CPU 133 refers to the gripping mode table 400 stored in the memory 134, and determines whether the gripping object is able to be gripped by the finger units without detected abnormalities. First, the CPU 133 compares types of gripping objects stored as the elements in the gripping mode table 400, and regards gripping modes coincident with the gripping object as selection candidates. Then, the CPU 133 compares the number of finger units without detected abnormalities with the number of finger units necessary for gripping that is the element of the gripping mode table. In a case where there is a coincident gripping mode, the CPU 133 determines the gripping object is able to be gripped.

In the present case, the type of gripping object is the workpiece A, and the number of finger unit in which no abnormality is detected is two. Since there is the gripping mode 401 in which the type of gripping object is the workpiece A, and the number of finger units without detected abnormalities is coincident with the number of finger units necessary for gripping, the CPU 133 determines that the workpiece A is able to be griped by the abnormality-undetected finger units (YES in step S902).

After that, the CPU 133 selects the gripping data number 1 from the gripping mode table 400, reads out the control program corresponding to the gripping mode 401 from the memory 134, and develops the control program on the unillustrated work memory (step S903).

Next, the CPU 133 moves the finger unit 111a in which the abnormality is detected to the finger unit retracting position (FIG. 12D) of the gripping mode 401. At that time, the CPU 133 moves all of the finger units 111a, 111b, and 111c to respective original positions once. Then, the CPU 133 moves the finger unit in which the abnormality is detected 111a to the finger unit retracting position (X1, Y1, Z1, A1, B1, and C1) that is represented by previously-taught coordinate values and rotation angles, and retraction of the finger unit 111a is completed (step S904).

In the present case, the finger unit is retracted with use of the finger unit retracting position (X1, Y1, Z1, A1, B1, and C1) that is preset in the gripping mode 401; however, the finger unit retracting position is not limited thereto. For example, the finger unit retracting position may be dynamically changed according to the positions of the other fingers.

Next, the CPU 133 executes the control program 1 of the gripping mode 401, and performs gripping (FIG. 12B or FIG. 12C) by the two finger units in which no abnormality is detected (step S905).

Finally, an operation state of the robot apparatus 100 is displayed on an unillustrated monitor (step S907). The CPU 133 displays the state of detected abnormality of the finger unit 111a on the unillustrated monitor. At the same time, the CPU 133 displays the execution state of the gripping continuation processing on the unillustrated monitor. The above-described monitor may be, for example, a teaching pendant or a monitor of an apparatus that collectively performs operation management of the robot apparatus, and a type of the monitor is not limiting.

Next, a case where abnormality of the finger unit 111b is further detected during the above-described gripping process is described.

First, the CPU 133 determines the abnormality-detected finger in a manner similar to the detection of abnormality of the finger unit 111a (step S901).

Next, the CPU 133 refers to the gripping mode table stored in the memory 134 and determines whether the workpiece A is able to be gripped by the finger units in which no abnormality is detected. In the present case, there is no gripping mode in which the type of gripping object is the workpiece A and the number of finger units in which no abnormality is detected is coincident with the number of finger units necessary for gripping. Accordingly, the CPU 133 determines that the gripping object is not able to be gripped by the finger units in which no abnormality is detected (NO in step S902).

Then, the CPU 133 performs stop processing of the robot hand main body 110 and the robot arm main body 120 (step S906).

Finally, the operation state of the robot apparatus 100 is displayed on the unillustrated monitor (step S907). In the present case, the stopped state of the robot hand main body 110 and the robot arm main body 120 is displayed on the unillustrated monitor.

The above description is the gripping continuation processing when abnormality of the finger unit 111a is detected. Also in the case where abnormality of the finger units 111b and 111c is detected, the processing is similarly performable. FIG. 14 illustrates a gripping mode table 600 in that case.

A gripping mode 601 illustrated in FIG. 14 is a mode in a case where the abnormality is detected in the finger unit 111a. Likewise, a gripping mode 602 is a mode in a case where the abnormality is detected in the finger unit 111b, and a gripping mode 603 is a mode in a case where the abnormality is detected in the finger unit 111c. A gripping mode 604 is a mode in a case where all of the finger units are normal.

The gripping mode in which the control program and the finger unit retracting position are changed according to the type of the finger unit in which the abnormality is detected is stored as described above. For example, the control program that changes a trajectory of the robot hand main body 110 and the robot arm main body 120 according to the type of the finger unit in which the abnormality is detected may be prepared. This makes it possible to perform the gripping continuation processing even when the abnormality is detected in any of the finger units.

In the present exemplary embodiment, the case has been described where the number of finger units of the robot hand main body 110 is three; however, the number of finger units is not limiting. For example, FIG. 15 illustrates a gripping mode table 700 when the number of finger units of the robot hand main body 110 is four.

As a gripping mode 701 shows in FIG. 15, all of the finger units may not be used from the start depending on the gripping object, and auxiliary finger units may be provided. For example, in a case where the type of gripping object is set as the workpiece A, the gripping mode table may be provided without preparing the control program for four finger units, and the control program number 2 for three finger units may be selected based on the control program priority.

Further, as a gripping mode 702 shows, when the abnormality of an optional finger unit is detected, control may be performed so as to use the auxiliary finger units in gripping. In that case, it is conceivable that the control program number of the gripping mode 702 may be all commonly set, and a speed of the gripping conveyance and the gripping position may be fixed. In that case, the control program priority is fixed, and the gripping data is determined according to the finger unit in which the abnormality is detected. In that case, it is possible to further suppress deterioration of the operating rate of the robot apparatus because the gripping conveyance speed is maintained.

Moreover, an imaging apparatus (not illustrated) may be provided on the robot apparatus 100, and the above-described gripping continuation processing may be performed also in a case where the positional information of each of the finger units 111a to 111c cannot be acquired.

So far, the description of the process has been limited to the gripping; however, the process is not limited thereto as long as the position of the object is moved using the plurality of finger units. For example, the present exemplary embodiment is applicable to a holding process and an adsorption process of the moving object.

In the above-described holding process, unlike the gripping, the object is not gripped but is moved. Accordingly, if the gripping continuation processing is replaced with holding continuation processing, the holding continuation processing may be performed in the moving process for placing a plate-like object. Description of a holding mechanism is omitted because the holding mechanism is not a main subject of the embodiments. For example, the holding mechanism discussed in Japanese Patent Application Laid-Open No. 2008-207263 may be used.

In the case of the adsorption process, if an adsorption unit or a cylinder assembly (not illustrated) is provided in each of the finger units 111a to 111c and the gripping process is replaced with an adsorption process, the adsorption process may be performed. Description of an adsorption mechanism is omitted because the adsorption mechanism is not a main subject of the embodiments. For example, the adsorption mechanism discussed in Japanese Patent Application Laid-Open No. 2015-168039 may be used.

In addition, it is readily conceivable that the gripping, the holding, and the adsorption are combined and used in the movement process of the object.

As described above, it is possible to continue the gripping process of the gripping object without stopping the robot apparatus by setting the gripping mode for the abnormal state even in the case where the abnormality of the finger units of the robot apparatus 100 is detected. This makes it possible to suppress deterioration of the operating rate of the robot apparatus.

A second exemplary embodiment will be described below. In the above-described exemplary embodiment, a level at which the finger unit is determined to be abnormal corresponds to the difference between the actual current and the driving current target value of the motor, namely, it is a degree that slows down the operation when the control is carried out, and the abnormal finger unit is operable to move to the retracting position.

In contrast, the present exemplary embodiment is performable in a case where the abnormal finger unit is completely stopped and the abnormal finger unit is not movable to the retracting position by the motor mounted on the joint of the finger unit.

In the following, a hardware and a part of the configuration of the control system different from those in the first exemplary embodiment are illustrated and described. Further, it is regarded that a part similar to the first exemplary embodiment has a similar configuration and performs similar action, and the detailed description of the part is omitted. In addition, the members and control functions same as or equivalent to those in the first exemplary embodiment are denoted by the same or similar reference numerals.

Figure 16A:
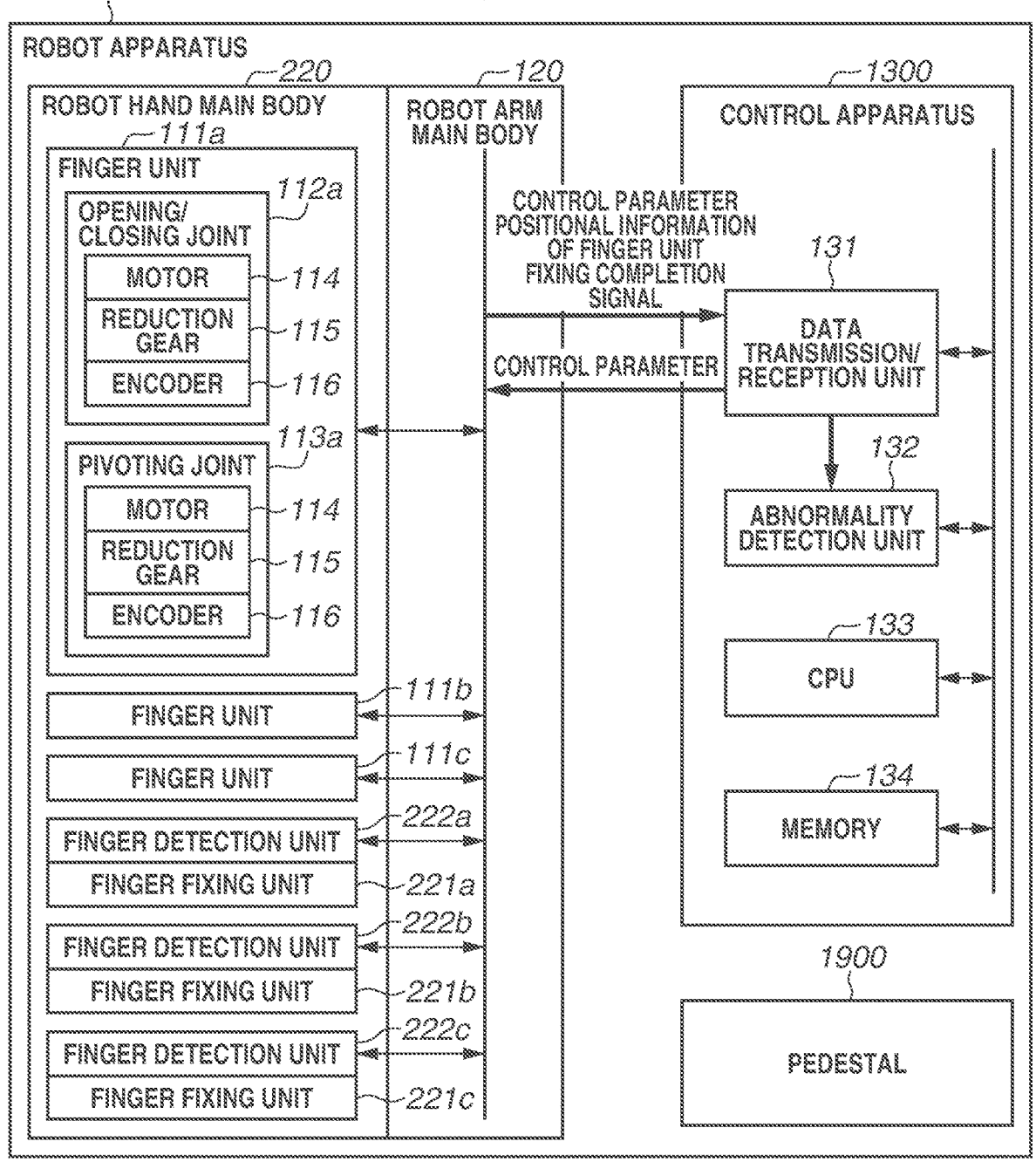
FIGS. 16A and 16B are a schematic configuration diagram of a robot apparatus and a block diagram of the entire robot apparatus, according to a second exemplary embodiment.

FIGS. ISA and 16B are a schematic configuration diagram and an entire block diagram of a robot apparatus 1000 according to the present exemplary embodiment. FIG. 16A is a schematic diagram illustrating an outline configuration of the robot apparatus 1000 according to the present exemplary embodiment, and FIG. 16B is a control block diagram thereof.

The robot apparatus 1000 illustrated in FIG. 16A includes a robot hand main body 220, the robot arm main body 120, a control apparatus 1300, and a pedestal unit 1900.

The pedestal unit 1900 is used in processing in which the control apparatus 1300 operates the robot hand main body 220 and the robot arm main body 120, and pushes the finger units 111a, 11b, and 111c against the pedestal unit 1900 to fix the finger units 111a, 111b, and 111c to finger fixing units 221a, 221b, and 221c.

Figure 16B:
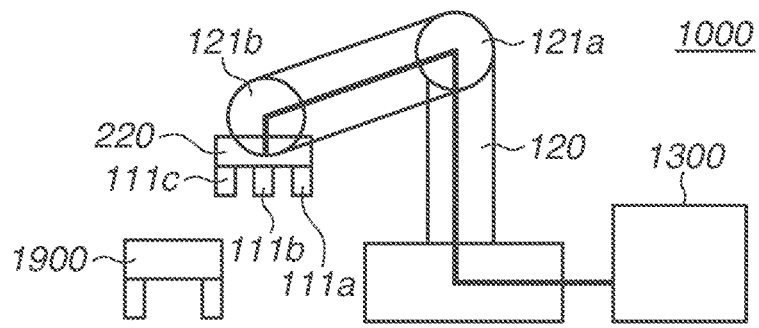

FIG. 16B is a block diagram illustrating an outline configuration of the robot hand main body 220 according to the present exemplary embodiment. The robot hand main body 220 is formed by adding the finger fixing units 221a, 221b, and 221c and finger detection units 222a, 222b, and 222c to the robot hand main body 110 described in the first exemplary embodiment.

FIG. 17A is a schematic diagram of the robot hand main body 220. FIG. 17B is a schematic diagram when the finger unit is fixed to the finger fixing unit. FIG. 17C is a detailed diagram of the finger fixing unit and the finger detection unit.

As illustrated in FIG. 17A, the finger fixing units 221a, 221b, and 221c are mechanisms for fixing the finger units 111a, 111b, and 111c. The finger detection units 222a to 222c (not illustrated in FIG. 17A) are provided inside the finger fixing units 221a to 221c.

In FIG. 17A, the finger units 111a to 111c include finger unit distal ends 1100a to 1100c that come into contact with the gripping object. As illustrated in FIG. 17B, the finger unit distal ends 1100a to 1100c are fixed to the finger fixing units 211a to 211c. When the finger unit distal ends 1100a to 1100c reach fixable positions, the finger detection units 222a to 222c: detect the reaching.

The finger detection units 222a to 222c detect that the finger unit distal ends 1100a to 1100c have reached the position fixable by the finger fixing units 221a to 221c. For example, a photosensor may be used as the finger detection unit. The photosensor is provided at a position where light is blocked when the finger unit distal ends 1100a to 1100c reach the positions where the finger unit distal ends 1100a to 1100c are fixed to the finger fixing units 221a to 221c. In the present exemplary embodiment, the finger fixing units 211a to 211c and the finger detection units 222a to 222c are provided in the robot hand main body 220; however, the configuration is not limiting. For example, the finger fixing units 211a to 211c and the finger detection units 222a to 222c may be provided in the robot arm main body 120, if a length of the finger unit distal ends 1100a to 1100c allows.

As illustrated in FIG. 17C, the finger fixing units 221a to 221c are realized by installing a movable convex fixing mechanism 1201 on the finger unit distal ends 1100a to 1100c and installing am immovable concave fixing mechanism 1202 on the finger fixing units 221a to 221c. The movable convex fixing mechanism 1201 and the immovable concave fixing mechanism 1202 are known technique. The convex fixing mechanism 1201 is pushed into a hollow region 1203 when pressed, and pops out when released from pressing. The convex fixing mechanism 1201 is fitted to the concave fixing mechanism 1202, so that fixing of the finger unit distal ends 1100a to 1100b, namely, the finger units 111a to 111c is completed. The fixing mechanism is not limited thereto as long as the fixing mechanism has a configuration for fixing the finger unit.

Operation of the robot apparatus 1000 according to the present exemplary embodiment is described in detail below with reference to FIG. 18, FIGS. 19A to 19C, and FIGS. 20A to 20C.

FIG. 18 is a flowchart for the gripping continuation processing that is performed when the abnormality of the finger units is detected according to the present exemplary embodiment. Differences from the gripping continuation processing that is performed when the abnormality of the finger units is detected, according to the first exemplary embodiment will be described.

It is assumed that the gripping mode table 400 illustrated in FIG. 11 is used. Further, it is assumed that the workpiece A is selected as the gripping object, and the abnormality of the finger units is not detected. It is assumed that, at this time, the gripping mode 402 of the gripping data number 2 is selected from the control program priority written as the element of the gripping mode illustrated in FIG. 11, and the gripping process by the control program 2 is being performed.

The abnormality detection unit 132 acquires, from the data transmission/reception unit 131, the actual current flowing through the motor 114 of the finger units 111a to 111c, and the driving current target values of the motor 114 that are control parameters. Then, it is determined that the difference between the driving current target value of the motor 114 and the actual current flowing through the motor 114 is larger than the current abnormality difference threshold stored in the memory 134, and the flow is thus started. Finally, information indicating detection of abnormality (hereinafter, referred to as abnormality detection information) is stored in the memory 134. It is assumed that the finger unit in which the abnormality is detected is the finger unit 111a in the present case.

As illustrated in FIG. 18, the CPU 133 determines the number of abnormality-detected fingers (step S1401). The process in step S1401 is similar to the process in step S901.

Next, the CPU 133 executes step S1402. The process in step S1402 is similar to the process in step S902, and similar determination is made also in the present exemplary embodiment (YES in step S1402).

Next, the CPU 133 executes step S1403. The process in step S1403 is similar to the process in step S903.

Next, the CPU 133 moves the finger unit in which the abnormality is detected 111a to the finger unit retracting position in the gripping mode 401 (step S1404).

Figure 19A:
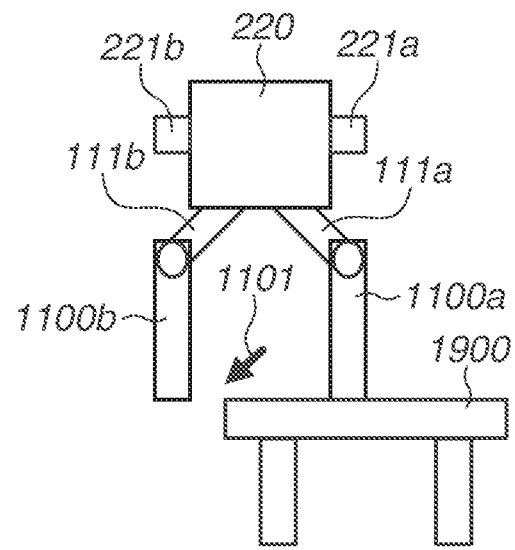
FIGS. 19A to 19C are schematic diagrams illustrating retraction processing of a finger unit according to the second exemplary embodiment.
Figure 19B:
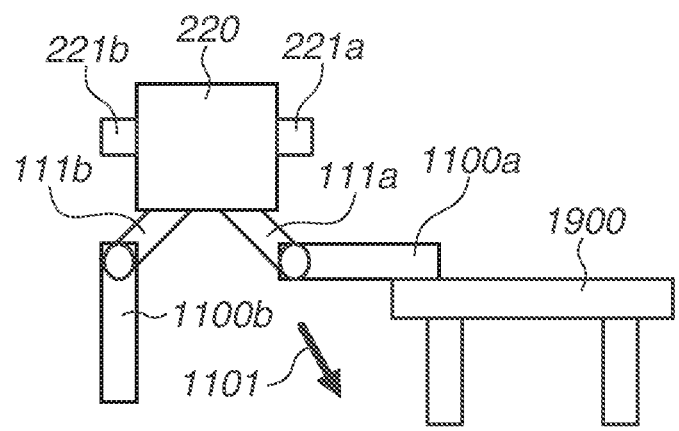
Figure 19C:
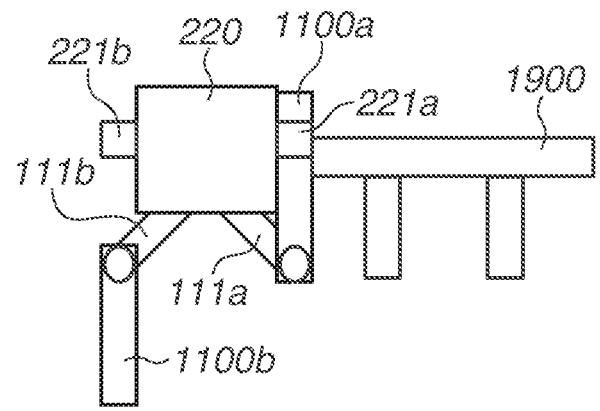

FIGS. 19A to 19C are schematic diagrams illustrating the finger unit retraction processing in step S1404. First, the robot hand main body 220 and the robot arm main body 120 are operated, and the finger unit distal end 1100a of the finger unit in which the abnormality is detected 111a is brought into contact with the pedestal unit 1900 (FIG. 19A). More specifically, the finger unit distal end 1100a of the opening/closing joint 112a that has been operated by the stopped motor 114 is brought into contact with the pedestal unit 1900. After that, the robot hand main body 220 is moved in a direction of an arrow 1101.

Next, the opening/closing joint 112a that has been operated by the stopped motor 114 is moved relative to the pedestal unit 1900, and the robot hand main body 220 and the robot arm main body 120 are moved. FIG. 19B illustrates a state where the finger unit distal end 1100a is rotated by 90 degrees from the state illustrated in FIG. 19A. After that, the robot hand main body 220 is moved in a direction of an arrow 1102.

Finally, the finger unit distal end 1100a comes into contact with the finger fixing unit 221a, and the finger unit 111a is accordingly fixed to the finger fixing unit 221a (FIG. 19C). Then, the finger detection unit 222a detects that the finger unit 111a has been fixed to the finger fixing unit 221a, and transmits the detection result as a fixing completion signal to the data transmission/reception unit 131.

FIGS. 20A to 20C are schematic diagrams illustrating fixing processing of the finger unit Ilia according to the present exemplary embodiment. In a state illustrated in FIG. 20A, the finger unit distal end 1100a is not yet in contact with the finger fixing unit 221a.

As illustrated in FIG. 20B, when the convex fixing mechanism 1201 comes into contact with the finger fixing unit 221a, the convex fixing mechanism 1201 enters the hollow region 1203 provided in the finger unit distal end 1100a.

As illustrated in FIG. 20C, when the position of the convex fixing mechanism 1201 and the position of the concave fixing mechanism 1202 are coincident with each other, the convex fixing mechanism 1201 is sent out from the hollow region 1203 and fixing of the finger unit 111a is completed. The fixing mechanism is not limited thereto as long as the fixing mechanism has a configuration to fix the finger unit.

In addition, with respect to the retraction operation of the finger unit in step S1404 its operation pattern is previously taught, and the retraction processing of the finger unit is included in each control program.

Next, the CPU 133 executes step S1405. The process in step S1405 is similar to the process in step S905.

Finally, the CPU 133 executes step S1407. The process in step S1407 is similar to the process in step S907.

Further, in a case where abnormality of the finger unit 111b is further detected during the gripping process by the control program 1, the processing similar to the processing according to the first exemplary embodiment is performed.

The above description is the gripping continuation processing when abnormality of the finger unit ilia is detected. Naturally, if abnormality of the finger units 111b and 111c is detected, similar processing can be performed. In that case, the gripping mode table illustrated in FIG. 13 is also used as with the first exemplary embodiment.

The gripping mode in which the control program and the finger unit retracting position are changed according to the type of the finger unit in which the abnormality is detected, is stored as described above. For example, the control program that is changed in trajectory of the robot hand main body 110 and the robot arm main body 120 according to the type of the finger unit in which the abnormality is detected may be prepared. This makes it possible to perform the gripping continuation processing when the abnormality is detected in any of the finger units.

In the present exemplary embodiment, the finger unit is fixed by operating the robot arm main body 120 and the robot hand main body 220; however, the operation is not limited thereto. For example, the control apparatus 1300 and the pedestal unit 1900 may be configured to perform transmission/reception of a control signal (not illustrated). Further, the control apparatus 1300 may operate the pedestal unit 1900 to fix the finger units 111a to 111c to the finger fixing units 221a to 221c.

Moreover, a robot apparatus (not illustrated) may be separately prepared in place of the pedestal unit 1900, and the robot apparatus may be operated to fix the finger units 111a to 111c to the finger fixing units 221a to 221c. As for the control method, the pedestal unit 1900 may be replaced with the robot apparatus and similar operation may be performed.

Furthermore, the fixing units 221a to 221c and the fixing detection units 222a to 222c may be added to the robot apparatus 100 according to the first exemplary embodiment. In that case, the fixing detection units 222a to 222c may detect that the finger units 111a to 111c have been fixed to the fixing units 221a to 221c, and may determine completion of the finger retraction processing.

As described above, even in the case where the abnormality occurs on the motor 114 of any of the finger units 111a to 111c and the motor 114 cannot rotate, it is possible to continue the gripping process of the gripping object. This makes it possible to suppress deterioration of the operating rate of the robot apparatus.

A third exemplary embodiment is described below. The above-described second exemplary embodiment can be implemented in the case where the finger units are integrated with the robot hand main body. In contrast, the present exemplary embodiment can be implemented in a case where the finger units and the multifinger hand are separable.

In the following, a hardware and a part of the configuration of the control system different from those in the second exemplary embodiment are illustrated and described. Further, a part similar to the second exemplary embodiment has a similar configuration and performs similar action, and the detailed description of the part is omitted. The members and control functions same as or equivalent to those in the second exemplary embodiment are denoted by the same or similar reference numerals.

FIG. 21 is a block diagram illustrating an outline configuration of a robot apparatus 1200 according to the present exemplary embodiment. First, a case is described where finger units 231a to 231c are separable. As one example of the robot hand main body configuration in which the finger units are separable, a separation mechanism of a tether apparatus discussed in Japanese Patent No. 3809524 may be adapted to the finger units of the robot hand main body. Description of the separation mechanism of the finger units is omitted because the separation mechanism is not a main subject of the embodiments. The separation mechanism is used as a finger retraction mechanism 1312.

A case is described where the abnormality occurs on the motor 114 of the opening/closing joint 112a of the finger unit 231a and a state where the motor 114 does not rotate is detected.

In this case, it is not possible to operate the opening/closing joint 112a by its motor 114 of the opening/closing joint 112a of the finger unit 231a. However, it is possible to operate the motor 114 in each of the pivoting joint 113a and the finger units 231b and 231c.

The gripping continuation processing that is carried out when the abnormality of the finger units is detected according to the present exemplary embodiment is similar to the processing of the flowchart according to the second exemplary embodiment illustrated in FIG. 17 except for step S1404.

The retraction processing (step S1404) of the abnormal finger unit of the robot hand main body configured to separate the finger units according to the present exemplary embodiment, will be described.

In a case where the finger unit 231a is separable, the CPU 133 operates a robot hand main body 230 and the robot arm main body 120, and moves the finger unit 231a to a separation position. In the present exemplary embodiment, the finger unit 231a is separated on the pedestal unit 1900.

Then, the CPU 133 performs separation processing of the finger unit 231a. The separation processing is realized by the finger retraction mechanism 1312 formed using the existing technique as described above. Further, the CPU 133 transmits, to the data transmission/reception unit 131, a separation completion signal indicating completion of the separation.

As described above, it is possible to continue the gripping process of the gripping object also in the robot hand main body configured to separate the finger units.

Next, a case is described where the finger units 231a to 231c are configured to be accommodated. As an example of the robot hand main body configured to accommodate the finger units, a finger unit accommodation mechanism in a robot hand discussed in Japanese Patent Application Laid-Open No. 2011-240422 may be used. Description of the finger unit housing mechanism is omitted because the accommodation mechanism is not a main subject of the embodiments. The accommodation mechanism is used in the present exemplary embodiment as the finger retraction mechanism 1312.

The gripping continuation processing that is operated when the abnormality of the finger units is detected according to the present exemplary embodiment is similar to the processing of the flowchart according to the second, exemplary embodiment illustrated in FIG. 17 except for step S1404.

The retraction processing (step S1404) of the abnormally operating finger unit of the robot hand main body configured to accommodate the finger units according to the present exemplary embodiment, will be described.

The CPU 133 moves the finger unit in which the abnormality is detected 231a to the finger unit retracting position of the gripping mode 401 (step S1404). In a case of the finger units configured to be accommodated, the CPU 133 operates the robot hand main body 230 and the robot arm main body 120, and moves the finger unit 231a to the pedestal unit 1900. Thereafter, the CPU 133 performs housing processing of the finger unit 231a. In the housing processing, the finger unit 231a is pressed against the pedestal unit 1900, and the finger unit 231a is accordingly accommodated in the finger retraction mechanism 1312 in a manner similar to the finger fixing processing in step S1404 that is the retraction processing described in the second exemplary embodiment. The CPU 133 then transmits, to the data transmission/reception unit 131, an accommodation completion signal indicating completion of the housing.

The robot hand main body is not limited to that described above as long as the robot hand main body can take a mode in which the abnormal finger unit does not influence an operation of the normal finger units necessary for the gripping.

Accordingly, it is possible to continue the gripping process of the gripping object also in the robot hand main body configured to accommodate the finger units.

The gripping control procedure is based on the gipping mode functioning as a backup for the gripping object at the time of insertion, and the gripping mode for continuing the gripping when the abnormality of the finger units is detected in the above-described first and third exemplary embodiments. The gripping control procedure is executed by the control apparatus 130 or 1300. Accordingly, a recording medium including a program of software realizing the above-described functions is supplied to the control apparatus 130 or 1300. The CPU 133 of the control apparatus 130 or 1300 then reads and executes the program stored in the recording medium to achieve the functions. In this case, the program read out from the recording medium realizes the functions in each of the above-described exemplary embodiments, and the program itself and the recording medium including the program constitute the embodiments.

Further, in each of the above-described exemplary embodiments, the case has been described where the computer-readable recording medium is the memory 134 and the program is stored in the memory 134 but is not limited to such a form. The program for implementation of the present invention may be recorded in any of computer-readable recording media. Examples of the recording medium to supply the program include a read only memory (ROM), a RAM, a hard disk (HDD), an external storage device, and a recording disk.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing-systems, an optical disk (such as a compact disc (CD), digital versatile disc (DVD), or Blu-ray Disc (BD™, a flash memory device, a memory card, and the like.

Aspects of the present invention can be realized by supplying a program implementing one or more functions of the above-described exemplary embodiments to a system or an apparatus through a network or a storage medium, and reading and executing the program by one or more processors in a computer of the system or the apparatus. In addition, the present invention can be realized by a circuit (e.g., application specific integrated circuit (ASIC)) that implements one or more functions.

While the above has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129349, filed Jun. 30, 2017, which is hereby incorporated by reference herein in its entirety.

What is claimed is:

1. A robot hand comprising:
   three or more finger units configured to grip an object by the finger units; and
   a control unit configured to, when assembling the object to another object, assemble the object to the another object by, in a state where the object is gripped by two or more of the finger units, not operating the two or more of the finger units used for gripping the object but operating one or more of the finger units other than the two or more of the finger units in an assembling direction and moving the object in the assembling direction.

2. The robot hand according to claim 1, wherein, when the object is assembled to the another object, the finger units are used as regulation units configured to regulate movement of the object in a direction opposite to the assembling direction by not moving the entire robot hand but moving the one or more of the finger units in the assembling direction.

3. The robot hand according to claim 2, wherein, before the control unit assembles the object to the another object, the control unit causes the one or more of the finger units to be used as regulation units in a state where the object is gripped by the two or more of the finger units.

4. The robot hand according to claim 1, wherein, when the object is gripped by the robot hand, the control unit uses one or more of the finger units as the regulation units each regulating the object not to be affected by gravitational forces.

5. The robot hand according to claim 1,
wherein one or more of the finger units used as the regulation units include a force detection unit, and
wherein a contact position of the finger units contacting the object is changed based on a detection value of the force detection unit.

6. The robot hand according to claim 1, wherein the control unit includes a plurality of gripping modes to grip the object, grips the object in a gripping mode that is different from a gripping mode in which one or more of the finger units are used as the regulation units, and switches the gripping mode to the gripping mode in which one or more of the finger units are used as the regulation units after the object is conveyed to a predetermined position.

7. The robot hand according to claim 1, wherein the finger units are configured to hold or adsorb the object.

8. The robot hand according to claim 1, wherein the control unit is configured to detect an abnormality of the finger units by an abnormality detection unit, control the robot hand to retract one or more of the finger units in which an abnormality has been detected by the abnormality detection unit, to predetermined retracting positions that do not interfere with a gripping operation for the object.

9. The robot hand according to claim 8, further comprising:
fixing units configured to fix the finger units; and
a pedestal unit configured to fix the finger units to the corresponding fixing unit,
wherein the control unit fixes one or more of the finger units in which an abnormality has been detected, to the fixing units with use of the pedestal unit.

10. The robot hand according to claim 8,
wherein the finger units are separable from the robot hand, and
one or more of the finger units in which the abnormality has been detected are separated from the robot hand.

11. The robot hand according to claim 1, further comprising:
a driving mechanism configured to cause the three or more finger units to independently approach one another or to independently separate from one another; and a pivoting mechanism configured to turn two or more of the three or more finger units to change an approaching direction or a separating direction of the two or more finger units,
wherein the control unit controls a contact position of the finger units contacting the object by the driving mechanism and the pivoting mechanism.

12. A robot apparatus comprising the robot hand according to claim 1 in a robot arm.

13. A method of manufacturing an article by using the robot apparatus according to claim 12 to assemble the object to the another object.

14. A method of controlling a robot hand that includes three or more finger units and grips an object by the finger units, the robot hand including a driving mechanism, a pivoting mechanism, and a control unit, the driving mechanism causing the three or more finger units to independently approach one another or independently separate from one another, the pivoting mechanism turning two or more of the three or more finger units to change an approaching direction or a separating direction of the two or more finger units, and the control unit controlling the driving mechanism and the pivoting mechanism, the method comprising:
gripping the object with use of at least two of the finger units; and
assembling the object to another object by, in a state where the object is gripped by two or more of the finger units, not operating the two or more of the finger units used for gripping the object but operating one or more of the finger units other than the two or more of the finger units in an assembling direction and moving the object in the assembling direction.

15. The control method according to claim 14, wherein, when the object is assembled to the another object, the finger units are used as regulation units configured to regulate movement of the object in a direction opposite to the assembling direction by not moving the entire robot hand but moving the one or more of the finger units in the assembling direction.

16. The control method according to claim 14, further comprising:
including a plurality of gripping modes to grip the object by the control unit;
gripping the object in a gripping mode different from a gripping mode in which one or more of the finger units are used as the regulation units;
conveying the object to a predetermined position; and
switching the gripping mode to the gripping mode in which one or more of the finger units are used as the regulation units.

17. A non-transitory computer-readable storage medium storing a program for causing a computer to execute the control method of the robot hand according to claim 14.

* * * * *